United States Patent
Ori et al.

(10) Patent No.: US 9,797,379 B2
(45) Date of Patent: Oct. 24, 2017

(54) POWER GENERATING APPARATUS EXPLOITING WIND ENERGY AND METHOD FOR OPERATING THEREOF

(71) Applicant: Elite Account Kft., Zengovarkony (HU)

(72) Inventors: Endre Ori, Paty (HU); Gabor Deme, Paty (HU)

(73) Assignee: ELITE ACCOUNT KFT., Zengovarkony (HU)

( * ) Notice: Subject to any disclaimer, the term of this patent is extended or adjusted under 35 U.S.C. 154(b) by 305 days.

(21) Appl. No.: 14/380,028

(22) PCT Filed: Feb. 22, 2013

(86) PCT No.: PCT/HU2013/000018
§ 371 (c)(1),
(2) Date: Aug. 20, 2014

(87) PCT Pub. No.: WO2013/124699
PCT Pub. Date: Aug. 29, 2013

(65) Prior Publication Data
US 2015/0028592 A1    Jan. 29, 2015

(30) Foreign Application Priority Data
Feb. 23, 2012    (HU) .................................... 1200117

(51) Int. Cl.
*F03D 9/00* (2016.01)
*H02P 9/04* (2006.01)
(Continued)

(52) U.S. Cl.
CPC ............... *F03D 9/002* (2013.01); *F03D 1/02* (2013.01); *F03D 1/025* (2013.01); *F03D 5/00* (2013.01);
(Continued)

(58) Field of Classification Search
CPC ... F03D 1/00; F03D 1/001; F03D 5/00; F03D 7/00; F03D 7/02; F03D 9/00; F03D 9/002; H02K 7/18; H02K 7/183
(Continued)

(56) References Cited

U.S. PATENT DOCUMENTS

| 1,717,552 | A | * | 6/1929 | Dunn | ..................... B64D 27/00 |
| | | | | | 180/2.2 |
| 2,384,893 | A | * | 9/1945 | Crook | ..................... B64C 39/10 |
| | | | | | 244/15 |

(Continued)

FOREIGN PATENT DOCUMENTS

WO         2010/148373        12/2010

OTHER PUBLICATIONS

International Search Report, dated Jul. 18, 2013, issued in International Application No. PCT/HU2013/000018 (4 pages).
(Continued)

*Primary Examiner* — Tulsidas C Patel
*Assistant Examiner* — Thomas Quigley
(74) *Attorney, Agent, or Firm* — Beem Patent Law Firm

(57) ABSTRACT

The invention is on the one hand a power generating apparatus exploiting wind energy, comprising a body (10), a main rotor unit (12) comprising a front rotating part being fitted with front blades being adjustable at an angle, and a rear rotating part being fitted with rear blades adjustable at an angle, said front rotating part and rear rotating part have rotation axes aligned parallel to each other, preferably being coincident with each other, a blade adjustment unit being adapted for adjusting of the front blades and the rear blades to rotate in opposite directions, a cable (18) enabling kiting of the body (10), a generator unit adapted for generating electric power from rotation of the front rotating part and the rear rotating part, and a wire adapted for conducting electric
(Continued)

power generated by the generator unit, and the main rotor unit (12) is arranged in an opening (11) of and coupled to the body (10), and the main rotor unit (12) comprises blades being turnable into a covering position covering at least partly the opening (11). On the other hand, the invention is a method for operating the power generating apparatus.

29 Claims, 21 Drawing Sheets

(51) Int. Cl.
    *F03D 1/02*     (2006.01)
    *F03D 5/00*     (2006.01)
    *F03D 7/02*     (2006.01)
    *F03D 13/20*     (2016.01)
    *F03D 9/25*     (2016.01)

(52) U.S. Cl.
    CPC .................. *F03D 7/02* (2013.01); *F03D 9/25* (2016.05); *F03D 13/20* (2016.05); *F05B 2240/921* (2013.01); *Y02E 10/70* (2013.01); *Y02E 10/728* (2013.01)

(58) Field of Classification Search
    USPC ..................................................... 290/44, 55
    See application file for complete search history.

(56) References Cited

U.S. PATENT DOCUMENTS

| | | | |
|---|---|---|---|
| 4,219,303 A * | 8/1980 | Mouton, Jr. | F03B 17/061 415/123 |
| 4,683,388 A * | 7/1987 | De Cesare | H02K 19/00 310/112 |
| 6,781,254 B2 | 8/2004 | Roberts | |
| 7,582,981 B1 | 9/2009 | Meller | |
| 7,709,973 B2 * | 5/2010 | Meller | F03D 1/025 290/44 |
| 2011/0057453 A1 | 3/2011 | Roberts | |
| 2011/0121570 A1 * | 5/2011 | Bevirt | F03D 5/06 290/44 |
| 2015/0233254 A1 * | 8/2015 | Villarreal | F03D 9/25 416/90 A |

OTHER PUBLICATIONS

Written Opinion of the International Searching Authority, dated Jul. 18, 2013, issued in International Application No. PCT/HU2013/000018 (5 pages).
Honeywell 2011 North America Catalog—Blade Tip Power System—Mar. 18, 2011.

\* cited by examiner

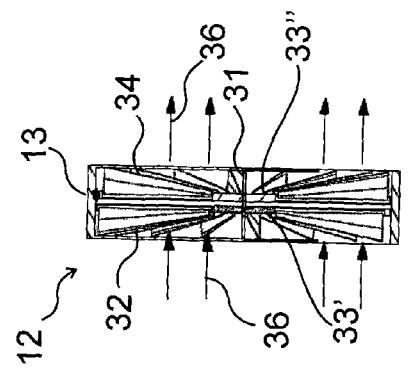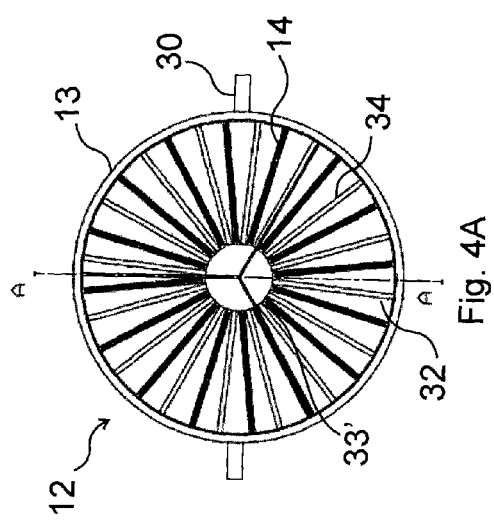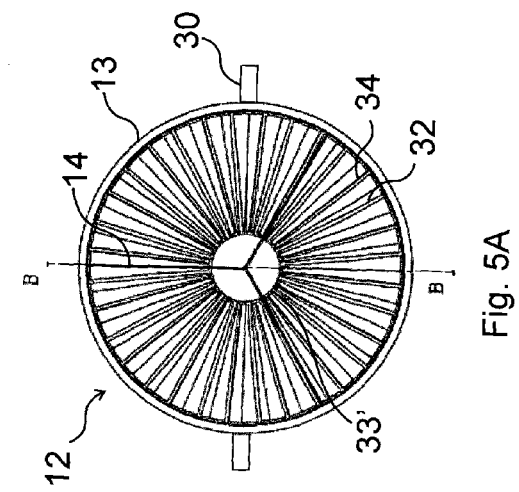

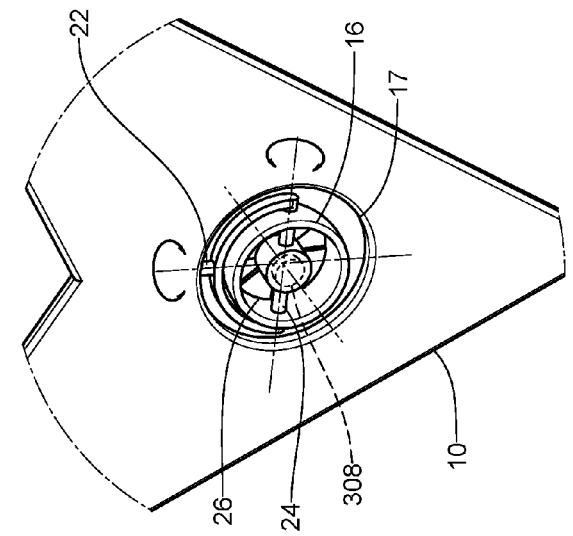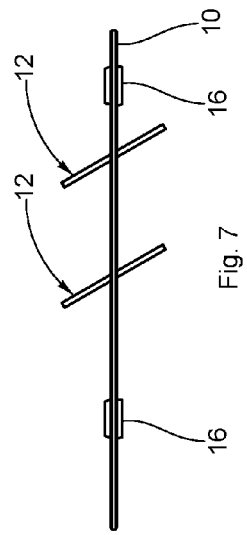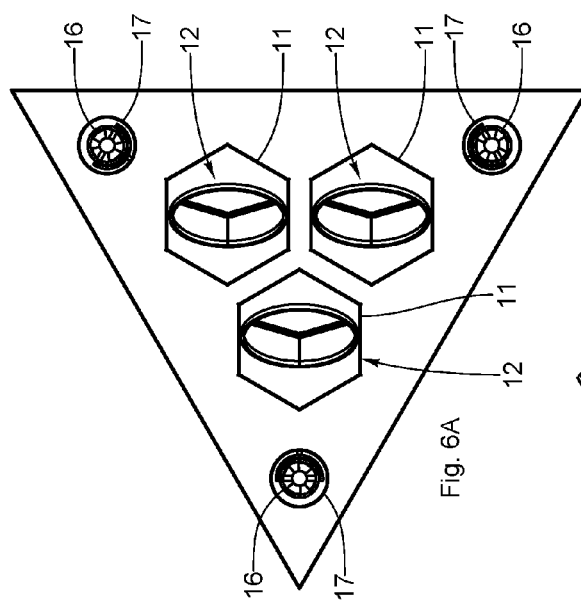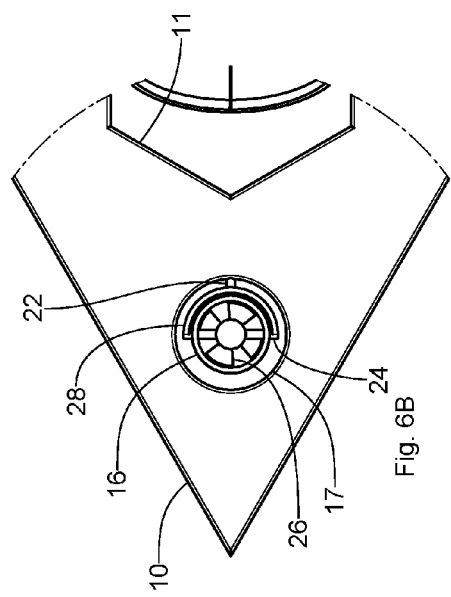

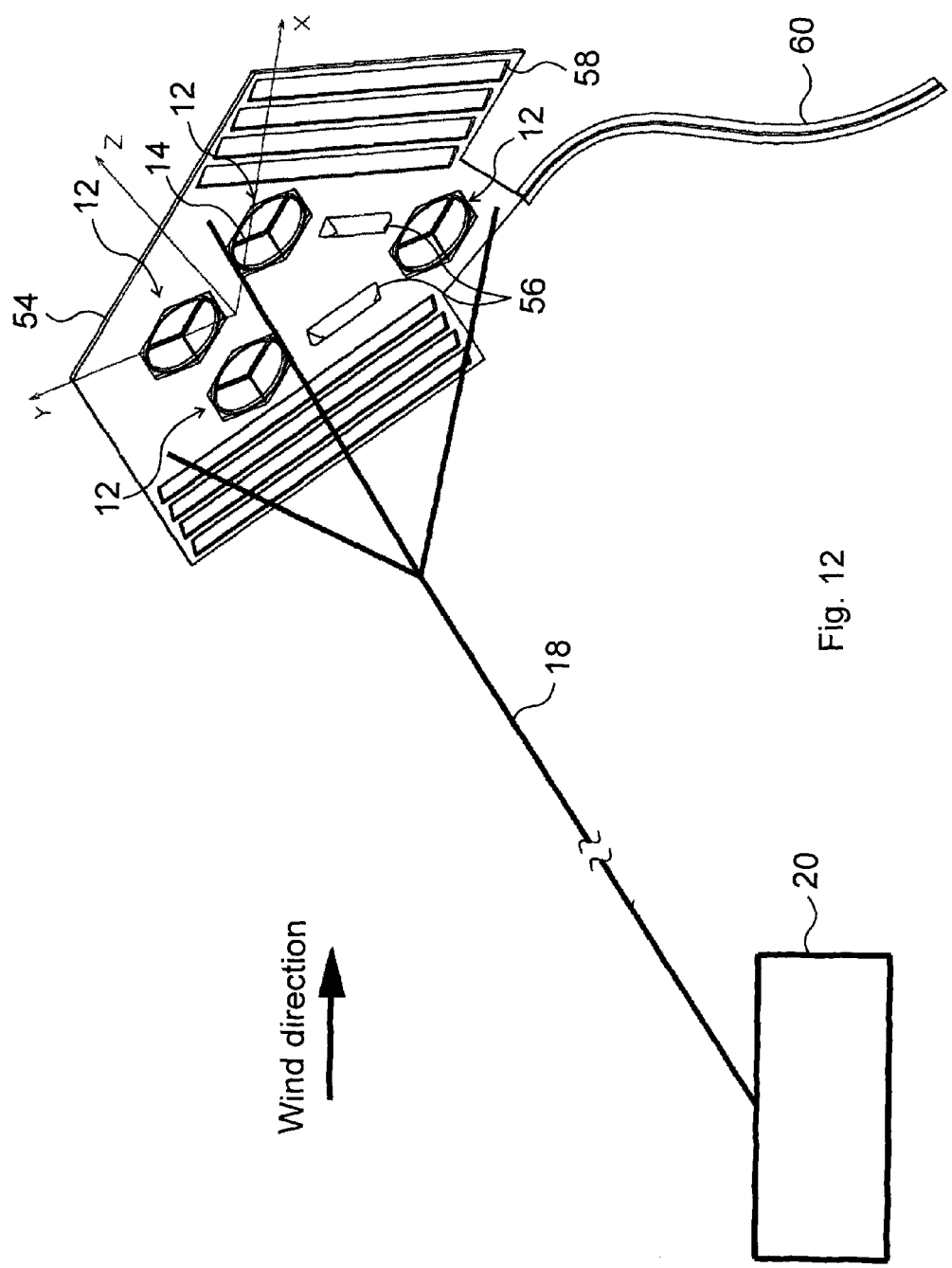

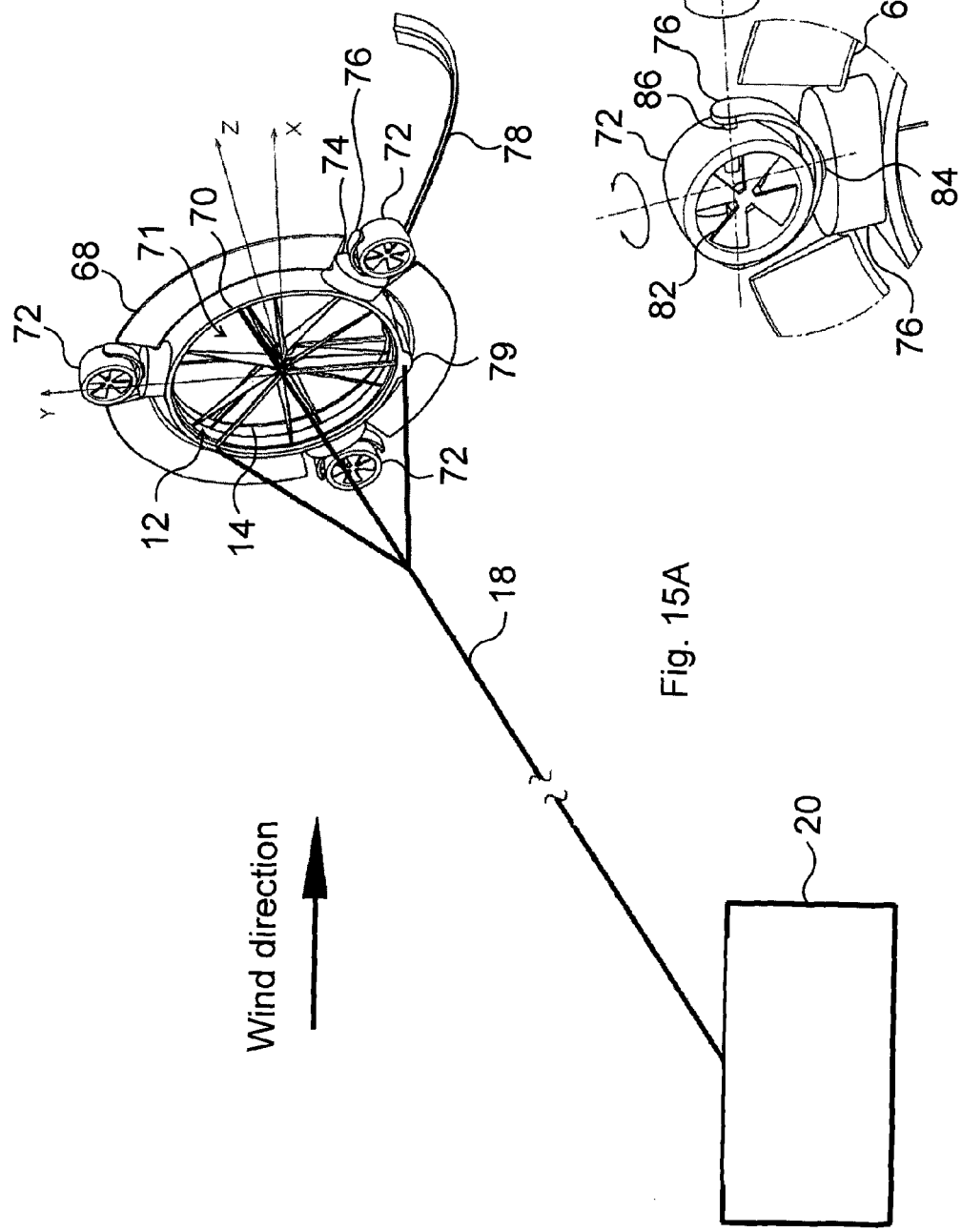

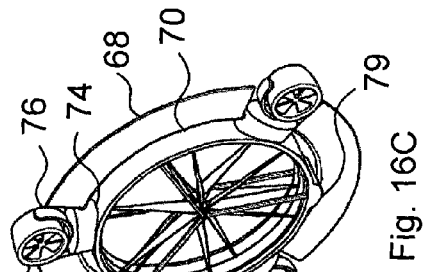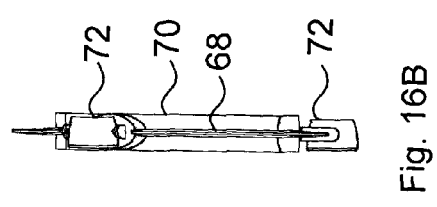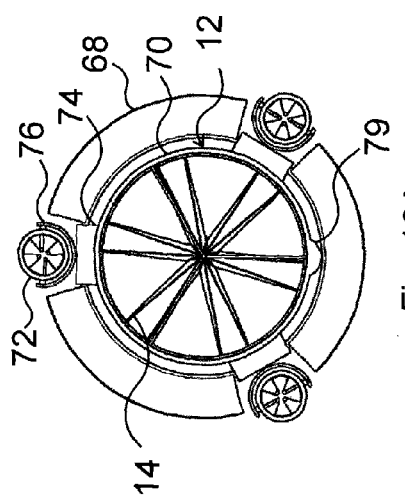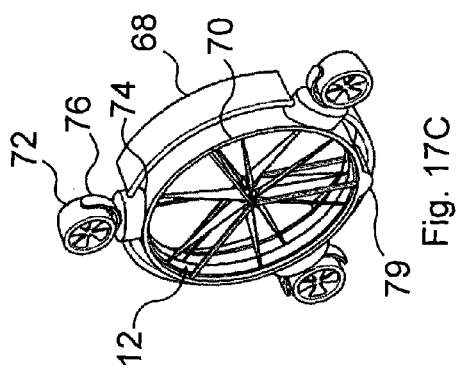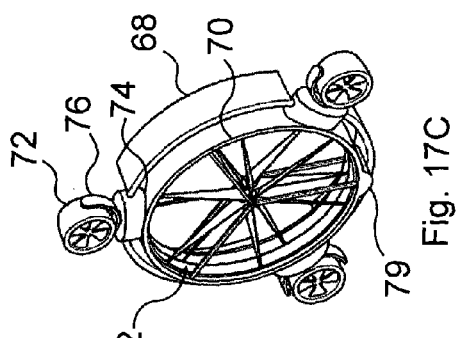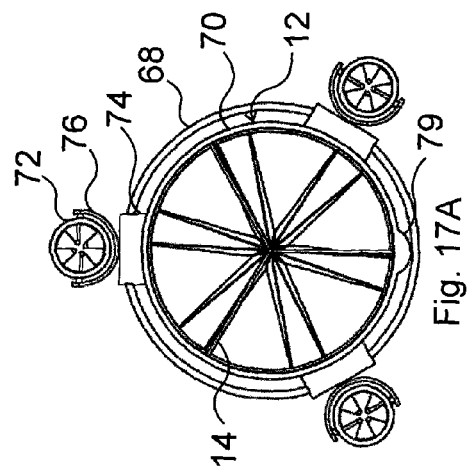

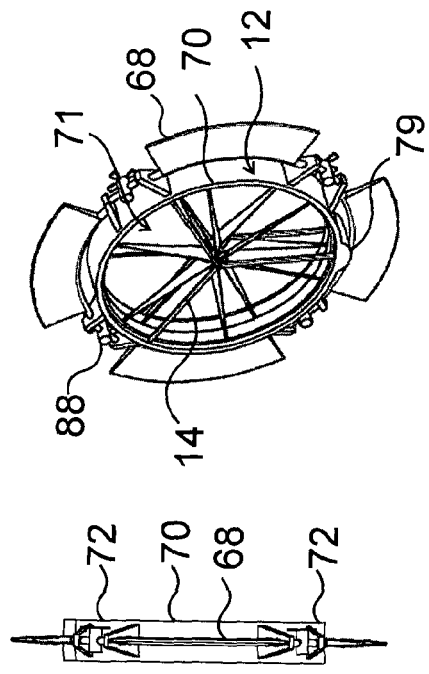
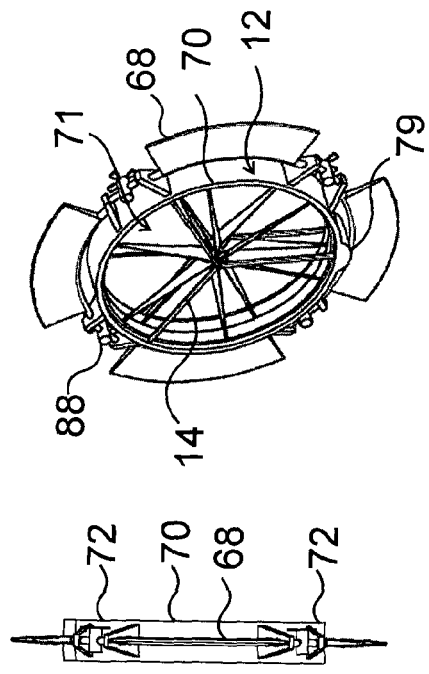
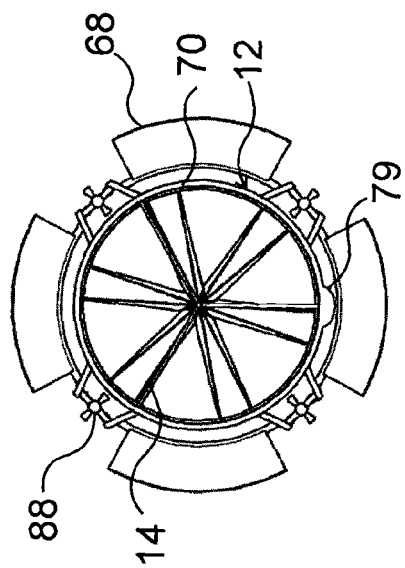
Fig. 19A
Fig. 19B
Fig. 19C
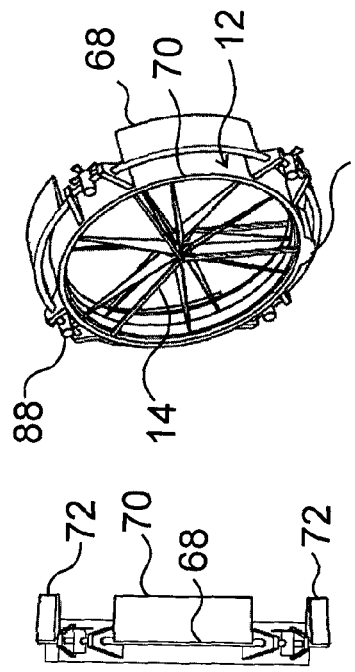
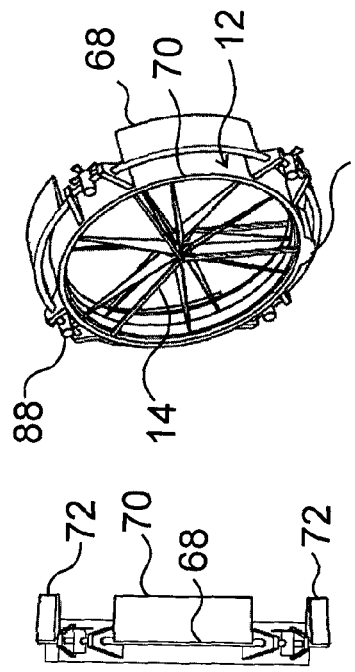
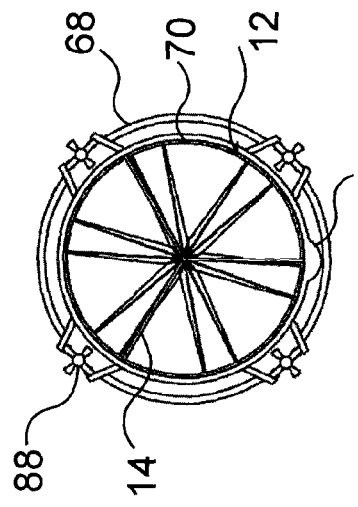
Fig. 20A
Fig. 20B
Fig. 20C

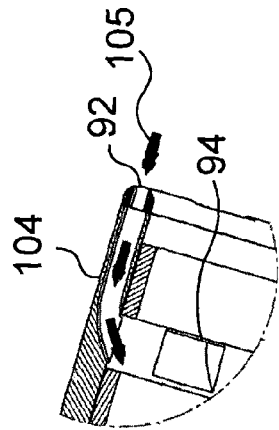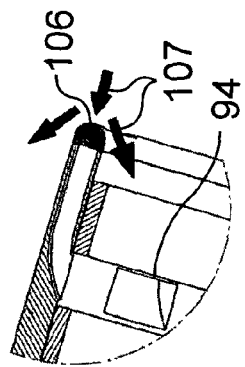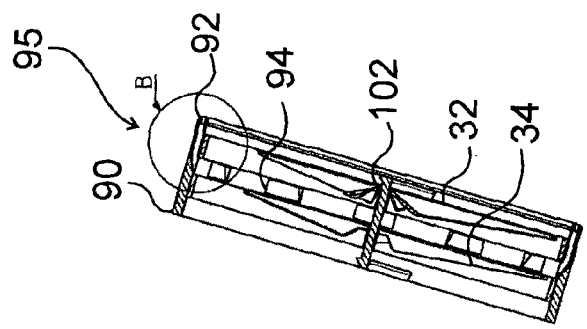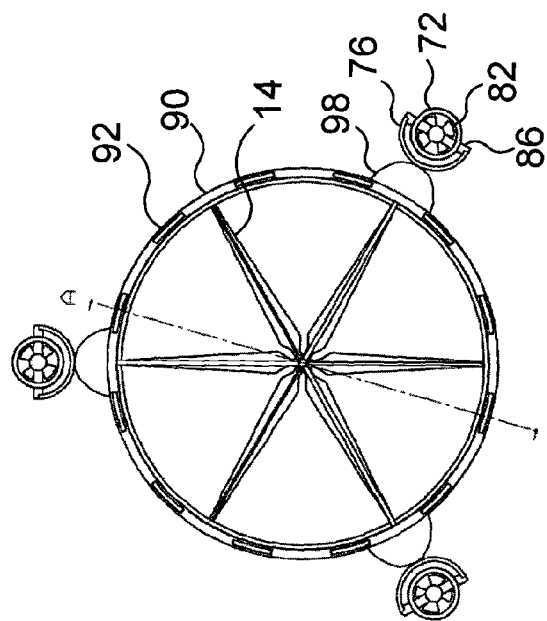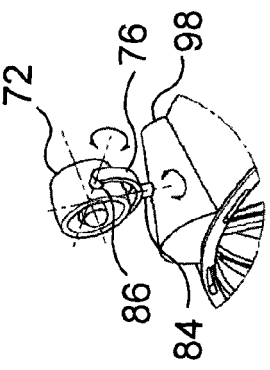

POWER GENERATING APPARATUS EXPLOITING WIND ENERGY AND METHOD FOR OPERATING THEREOF

This application claims benefit of priority from International Patent Application No: PCT/HU2013/000018 filed Feb. 22, 2013.

TECHNICAL FIELD

The invention relates to a power generating apparatus exploiting wind energy and a method for operating thereof.

BACKGROUND ART

Nowadays, because of the gradual depletion of fossil energy reserves, it becomes increasingly important and indispensable to obtain energy from renewable power sources. Some renewable power source—for example solar power, geothermal power, etc.—can be harnessed with various efficiencies. The exploiting of wind energy seems to be promising, but in the case of wind energy, there are several factors, which restrict utilisation. With ground-installed wind power plants, a frequently occurring problem is the unsteady nature of the wind that makes difficult the use of this power source predictably and continuously. This problem is diminishing, if a wind power plant is located in the highest possible atmospheric layers, because at higher altitudes the wind is more balanced. Spreading of ground wind power plants therefore hits against significant difficulties, and hence other solutions are necessary for harnessing potentially useable wind energy at altitudes unavailable for ground power plants.

Due to the emerging needs, several approaches are known for soaring wind power plants. According to U.S. Pat. No. 7,821,149 B2 and U.S. Pat. No. 7,582,981 B1, the hovering of the structures in the air is ensured by a tank filled up with a gas lighter than air, by a kiting structure or, according to the latter document, by a helicopter. In the wind power plant according to these documents, power is generated by turbines running on a common shaft. The turbines rotate in opposite directions, and their power is controlled in a way that the torque exerted on the wind power plant is to be zero. The documents also describe a wind power plant system in which several wind power plants are connected in series by means of ropes, i.e. they are hovering in offset positions. It is a disadvantage of the wind power plant described in these documents that the lifting and hovering in some embodiments are ensured by means of passive devices, where time to time it may become necessary to refill the tanks by an appropriate type of gas, and also that in unflattering weather conditions the lifting and the hovering cannot be ensured merely by a kiting structure. In other embodiments, the lifting and the hovering are ensured by an active structure, for example a helicopter, in which case the hovering of the structure requires continuous power input, which is disadvantageous. A further disadvantage of the wind power plant described in these documents is that the torque acting on the structure is minimised by controlling the output provided by the turbines turning in opposite directions.

In US 2011/0057453 A1, U.S. Pat. No. 6,781,254 B2, U.S. Pat. No. 7,109,598 B2 and U.S. Pat. No. 7,183,663 B2 wind power plants are disclosed, by which tiltable rotors are fixed to several points on a frame. A kite is also secured to the frame to ensure the hovering of the structure. The direction of rotation of the rotors is determined in a way that the resultant torque acting on the structure is zero. In the course of lifting, the rotors ensure the lifting of the wind power plant. When the structure reaches an appropriate height, some of the rotors switch to generator mode and generate power, while the other rotors contribute to the hovering of the structure. It is a disadvantage of the wind power plant according to the documents that when the tilting of the rotors, i.e. their symmetric arrangement is discontinued, the resultant torque acting on the structure will not be zero.

In U.S. Pat. No. 4,285,481 a wind energy exploiting structure is disclosed where the hovering is ensured by a kiting aerofoil, to which turbines converting wind energy into electric power are adjoined. It is a disadvantage of this structure that due to the arrangement of the turbines, zero torque acting on the apparatus is not ensured and therefore the hovering is unstable.

In U.S. Pat. No. 7,317,261 B2 a wind power plant is disclosed, which consists of a plurality of in series connected hovering power generating units. A hovering wind power plant is disclosed in US 2003/0006615 A1. In US 2011/0025061 A1 a control system of a hovering wind power plant is disclosed.

In light of known approaches, a need has emerged to develop a power generating apparatus harnessing wind energy, which eliminates the disadvantages of the known solutions.

DESCRIPTION OF THE INVENTION

The primary object of the invention is to provide an apparatus and a method for operation thereof, which is free of disadvantages of prior art solutions to the greatest possible extent.

An object of the invention is to develop a power generating apparatus exploiting wind energy, which comprises a front rotating part and a rear rotating part arranged on parallel-directed shafts, which said rotating parts are fitted with front blades and rear blades, respectively, being adjustable at an angle, and the torque acting on the apparatus is primarily minimised by the appropriate adjustment of the blade angle.

A further object of the invention is to develop a power generating apparatus, which comprises front and rear rotating parts that are able to contribute to the lifting of the apparatus, and in the stationary position of the rotors, they supplement the airfoil represented by the body.

A further object of the invention is to develop a method for operating the power generating apparatus, in the course of which as little energy as possible is invested to facilitate the lifting and hovering of the apparatus.

The objects of the invention can be achieved by the apparatus according to claim 1, and by the method according to claim 23. Preferred embodiments of the invention are defined in the dependent claims.

BRIEF DESCRIPTION OF THE DRAWINGS

Preferred embodiments of the invention are described below by way of example with reference to the following drawings, where FIG. 4A is the front view of the main rotor unit of FIG. 2, showing the blades in a first position, FIG. 4B is a sectional side view of the main rotor unit of FIG. 2, showing the blades in a first position, FIG. 5A is the front view of the main rotor unit of FIG. 2, showing the blades in a second position, FIG. 5B is a sectional side view of the main rotor unit of FIG. 2, showing the blades in a second position, FIG. 6A is a top view of the embodiment shown in FIG. 1, FIG. 6B is a view showing one detailed part of the embodiment of FIG. 1, FIG. 6C is a perspective view of the auxiliary rotor unit of the embodiment shown in FIG. 1, FIG. 7 is a side view of the embodiment shown in FIG. 1, FIG. 12 is a perspective view of a further embodiment of the power generating apparatus according to the invention, FIG. 15A is a perspective view of a further embodiment of the power generating apparatus according to the invention, FIG. 15B is a perspective view of the auxiliary rotor unit in the embodiment of FIG. 15A, FIGS. 16A to 16C are the front view, side view and perspective view, respectively, of the embodiment shown in FIG. 15A in the open position of wing blades, FIGS. 17A to 17C are the front view, side view and perspective view, respectively, of the embodiment shown in FIG. 15A in the closed position of wing blades, FIGS. 19A to 19C are the front view, side view and perspective view, respectively, of the embodiment shown in FIG. 18 in the open position of wing blades, FIGS. 20A to 20C are the front view, side view and perspective view, respectively, of the embodiment shown in FIG. 18 in the closed position of wing blades, FIG. 22A is a front view of the embodiment shown in FIG. 21, FIG. 22B is a perspective view of the auxiliary rotor unit in the embodiment of FIG. 21, FIG. 23A is a sectional side view of the embodiment shown in FIG. 21, FIG. 23B presents a part of FIG. 23A with closed bore, FIG. 23C presents a part of FIG. 23A with closed bore.

MODES FOR CARRYING OUT THE INVENTION

Figure 1:
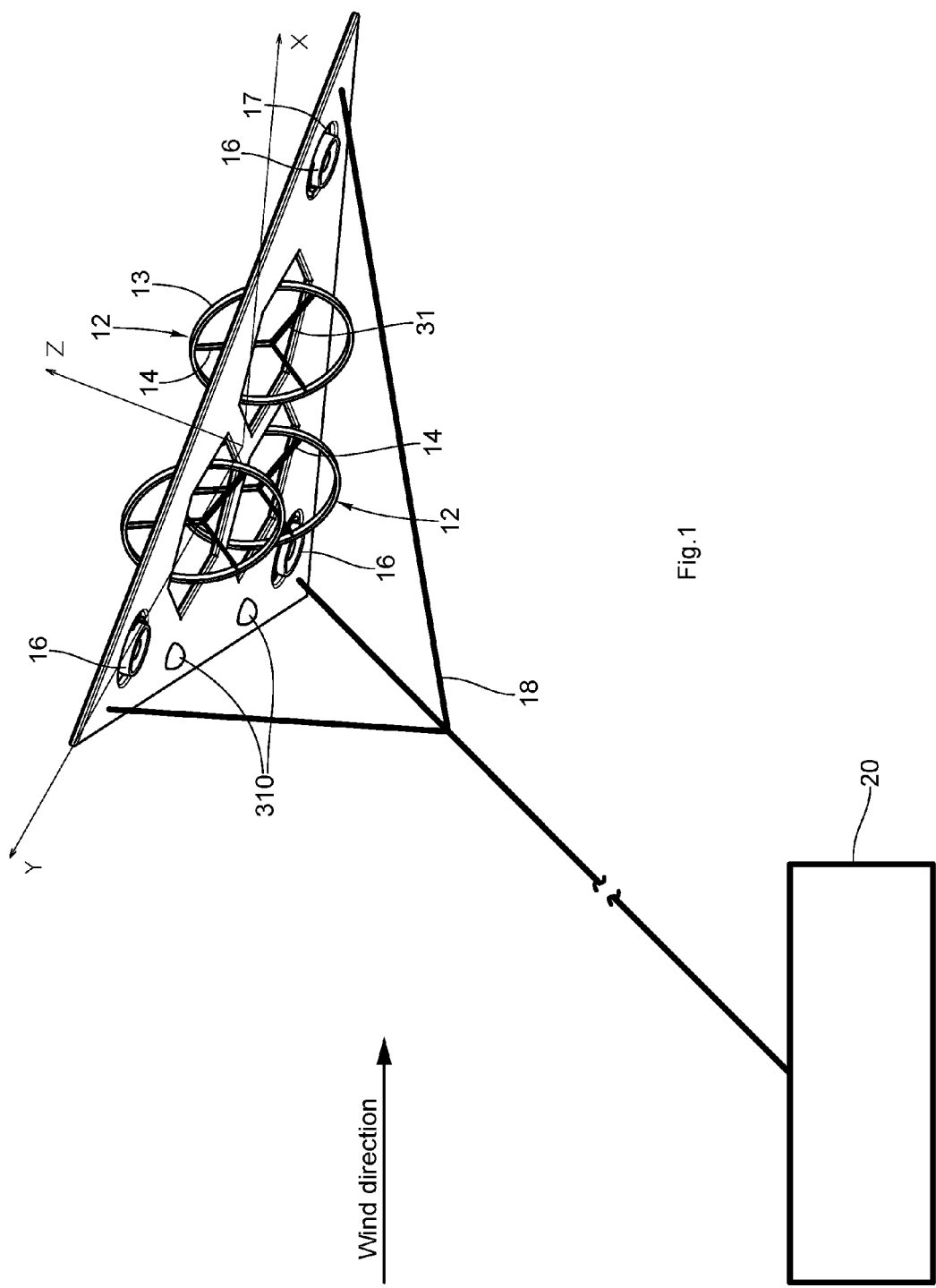
FIG. 1 is a perspective view of an embodiment of the power generating apparatus according to the invention.
Figure 2:
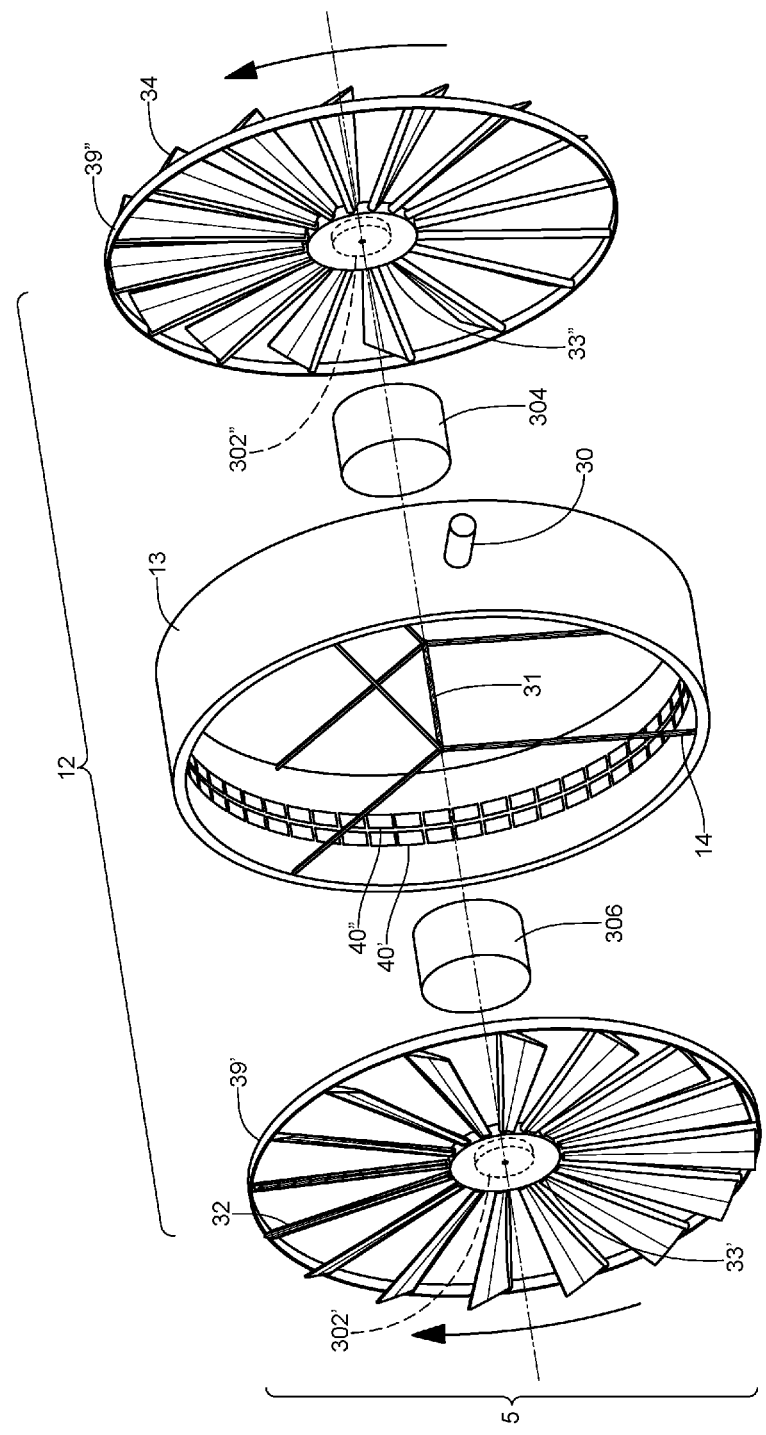
FIG. 2 is an exploded view of an embodiment of the structure of a main rotor unit of the power generating apparatus according to the invention.

FIG. 1 is a perspective view of an embodiment of the power generating apparatus according to the invention exploiting wind energy. In this embodiment, the apparatus comprises a body 10 having essentially a flat surface and designed to facilitate the lifting and hovering of the apparatus. It further comprises a main rotor unit 12 comprising a front rotating part 25' fitted with front blades 32 being adjustable at an angle, and a rear rotating part 25" fitted with rear blades 34 adjustable at an angle, which said front rotating part 25' and rear rotating part 25" have rotation axes aligned parallel to each other, which in this embodiment is preferably coincident with each other. In this embodiment, the coincident rotation axes are provided in such a way that the rotating parts 25',25" are arranged on the same axis 31. The rotating parts 25', 25" are arranged in a frame 13 and are adjoined to the body 10 via the frame 13. The rotating parts 25', 25" fitted with blades 32, 34 and located within the frame 13 are shown in FIG. 2. The main rotor units 12 is arranged in an opening 11 of and coupled to the body 10. In the embodiment shown in FIG. 1, the apparatus comprises three main rotor units 12 arranged in three openings 11 of the body 10, respectively. The axis of the rotating parts can be parallelly directed also in such a manner that the rotating parts are not arranged behind one another, but side by side.

In this embodiment, the power generating apparatus according to the invention furthermore comprises a blade adjustment unit (302' and 302") both for the front rotating part 25' and the rear rotating part 25" in order to ensure that the front blades 32 and the rear blades 34 are adjusted in a way that they rotate in opposite directions—for example in wind—and it also comprises a cable 18 which enables the kiting of the body 10. FIG. 1 shows an exemplary arrangement of the cable 18, which can be arranged in several ways known per se, the number of its attachment points, is arbitrary. In this embodiment, the apparatus furthermore comprises a generator unit 306 adapted for generating electric power from rotation of the front rotating part 25', and the rear rotating part 25", a wire adapted for conducting the electric power generated by the generator unit 306, a driving unit 304 adapted for driving the front rotating part 25' and the rear rotating part 25" and three auxiliary rotor units 16 fixed to the body 10 which facilitate the lifting and the stabilizing the hovering of the apparatus, which said three auxiliary rotor units are arranged in the openings 17 of the body 10. The auxiliary rotor units 16 comprise an auxiliary rotating part fitted with blades 26 and an auxiliary driving unit 308 for driving the auxiliary rotating part. The blades 26 and the auxiliary rotating part fitted therewith are shown in FIG. 6C. In this embodiment, the cable 18 and the wire form one unit. The cable 18 is adjoined to a docking unit 20 as shown in the figure.

For sake of clarity, in the figures showing the various embodiments, the parts of the main rotor unit 12 are not depicted. According to the above description, the main rotor unit 12 comprises the frame 13, the rotating parts 25', 25", and the stiffening elements 14 supporting the shaft 31. In some of the figures, the stiffening element 14 supporting the shaft 31 is shown, and in the other figures in addition to the stiffening element 14, the members showing the blades schematically are depicted within the frame 13 to demonstrate the main rotor unit 12. The configuration of the main rotor unit of the apparatus according to the invention may preferably be identical in the various embodiments, but it can be configured in several other possible ways, and the coupling of the rotors representing the main rotor unit to the body of the apparatus may be conceived in a number of other ways, and not only via the frame 13.

In some embodiments of the invention, the auxiliary rotor units, and thus also in the embodiment shown in FIG. 1, are coupled to the body as being turnable around a first shaft and a second shaft arranged perpendicular to each other, and in a way that the auxiliary rotor unit can be adjusted in any direction, as it is shown for example with the embodiments in FIGS. 6B, 6C, 14B, 15B and 22B.

The main rotor unit 12 used with the power generating apparatus of some embodiments of the invention is shown in the exploded perspective view of FIG. 2. The blade adjustment unit (302' and 302") enables the independent adjustment of the front blades 32 and of the rear blades 34, and the blades 32 and 34 can be adjusted in relation to each other by means of the blade adjustment unit (302' and 302"), so that the sum of the torque of the front rotating part 25' and of the rear rotating part 25" shall essentially be zero. The blade adjustment unit (302' and 302") is arranged for example in the drums 33' and 33", respectively. The main rotor unit may also be configured with fewer blades, for example with three.

In relation to the prior art solutions, the invention bears the significant advantage, that the control of the torque acting on the apparatus is practically carried out by adjusting the tilting angle of the blades 32 and 34 of the main rotor unit 12 and of the rotor unit 95 shown in FIG. 23A. This means that the combined torque of the unit comprised by the rotating parts 25', 25" is minimised—for example by the use of a control system or by their prior setting—by adjusting the tilting angle of the blades 32 and 34. If this does not eliminate the resultant torque, then the resultant torque of the rotating parts 25', 25" can be further reduced in a known manner by controlling the output generated by the rotating parts 25', 25". In those embodiments of the invention, which comprise auxiliary rotor units, the resultant torque of the main rotor unit(s) can be reduced, or decreased to zero preferably by the appropriate adjustment of the auxiliary rotor units, without limiting the generated output. According to the above and below description, the auxiliary rotor unit can be turned for example in any direction around two shafts, or in certain embodiments in the exemplary embodiment of FIG. 18—around one shaft. In the known solutions, however, to have approximately zero combined torque of the two rotors turning in opposite directions, is only regulated by means of the limitation of the output powers generated by the rotating parts.

In the illustrated embodiments of the power generating apparatus according to the invention, the driving unit 304 and the generator unit 306 are integrated into the main rotor unit as described below. According to FIG. 2, the main rotor unit 12 in the present embodiment comprises a front rotating element 39' fixed to the ends of the front blades 32 configured as a rim, and a rear rotating element 39" fixed to the ends of the rear blades 34 configured as a rim as well, and a frame part 13 formed with a front stator element 40' and a rear stator element 40" provided densely arranged magnets matching the front rotating element 39' and the rear rotating element 39".

The front stator elements 40' and the rear stator elements 40" representing parts of the main rotor unit are not necessarily arranged on one frame. If the main rotor unit cannot be turned relating to the body, the stator elements 40', 40" can also be arranged on the sidewall of the openings housing the main rotor units in the body.

It can be ensured by means of the above main rotor unit 12—or with the main rotor unit 95 to be discussed later—that when the rotating parts 25', 25" are driven by the driving unit 304, they contribute to the lifting and hovering of the power generating apparatus. By means of the main rotor unit 12, 95 it can also be ensured that if the rotating parts 25', 25" are not driven by the driving unit 304 but by the wind, then the main rotor unit 12, 95 operates in generator mode. Accordingly, when the rotating parts 25', 25" are driven by the driving unit 304, the main rotor unit 12, 95 runs as an electric motor, and when they are driven by the wind, it works as a generator. In a way known per se, the rotating elements 39', 39" and the stator elements 40', 40" are created such that the main rotor unit 12, 95 can fulfil driving and generator functions. In accordance with the invention, this configuration preferably enabled that these two functions can be performed by the same unit of the apparatus.

Figure 3:
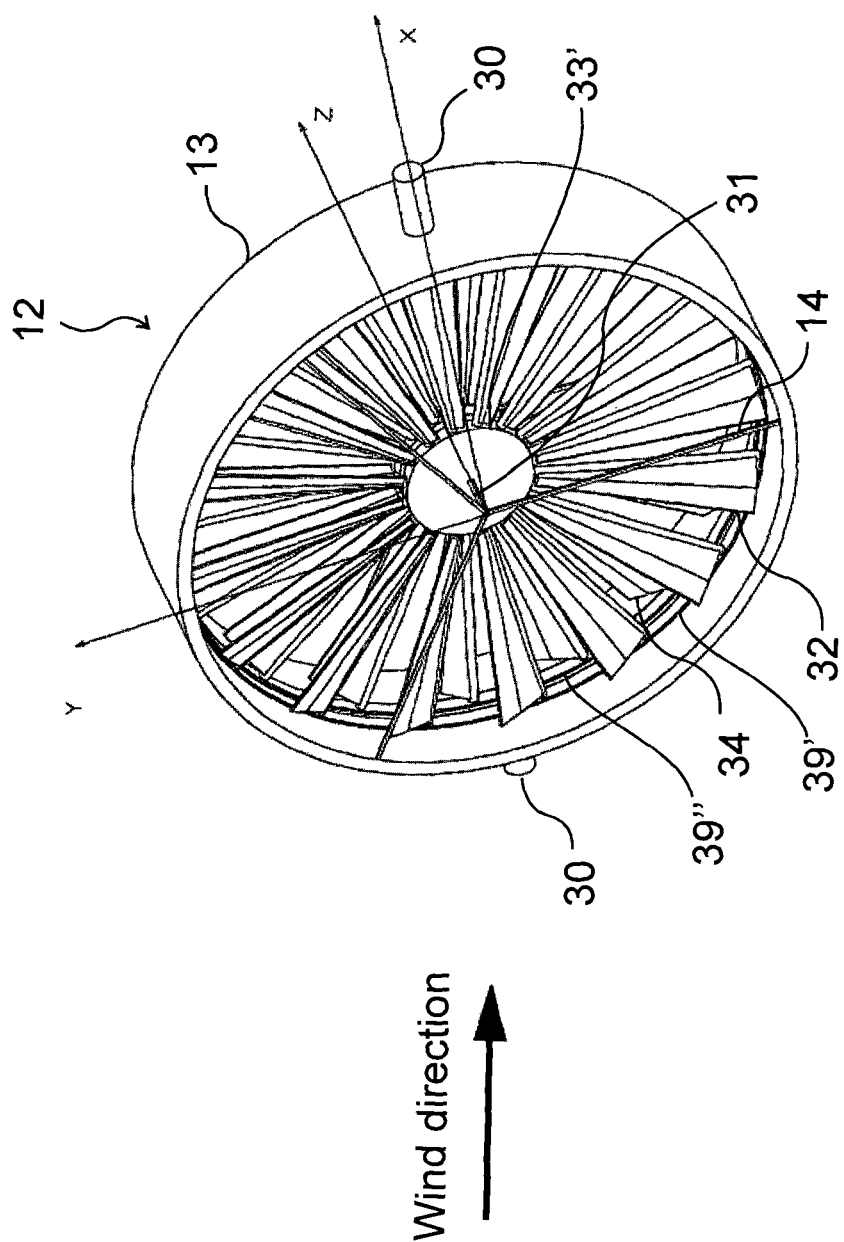
FIG. 3 is a perspective view of the main rotor unit shown in FIG. 2.

In FIG. 3 a perspective view of the main rotor unit 12 is shown. The figure shows that the frame 13 surrounds the front rotating part 25' and the rear rotating part 25" in the assembled state of the main rotor unit 12. The figure shows that a shaft 30 is arranged on the main rotor unit 12. The frame 13 of the main rotor unit 12 is coupled through the shaft 30 to the body of the power generating apparatus, and that the frame 13 can be rotated around the shaft 30. The main rotor unit 12 is not necessarily adjoined to the body through the shaft 30, but it may also be linked directly, and in this case, the main rotor unit 12 cannot be turned relating to the body.

In FIGS. 4A and 4B the so-called operating position of the front blades 32 and the rear blades 34 of the rotating parts 25', 25" is illustrated. In the operating position, the main rotor unit 12 driven by the driving unit 304 is capable of contributing to the lifting of the apparatus, and ensures that the rotating parts 25', 25" operate in generator mode when they are driven by the wind. FIG. 4B is a sectional view of the main rotor unit 12 in generator mode when the blades 32, 34 are in their operating position. The figure illustrates how the wind 36 streams between and drives the blades 32 and 34 of the rotating parts 25', 25".

The torque acting on the power generating apparatus and on the units comprising the rotating parts 25', 25" is minimised by adjusting the angles of the blades 32, 34 in their operating position, as follows. It is assumed that during hovering, the power generating apparatus is practically in the position shown in FIG. 1 in relation to the prevailing wind. In a non-restricting way it can also be assumed that the wind first hits the front rotating part 25', and so acts on the complete surface of the front blades 32 thereof, and in this arrangement, one part of the surface of the rear blades 34 of the rear rotating part 25" is covered by the front blades 32. As a result, if the tilting angle of each blade 32 and blade 34, respectively, were identical, the wind would exert a smaller torque on the rear rotating part 25" because it would reach a smaller area of the rear blades 34 as a result of the covering effect of the blades 32 of the rotating part 25'. Therefore, in case of the front blades 32 have a larger tilt angle than the blades 34, a larger surface of the rear rotating part 25" can be exposed to the wind, in comparison with the equal tilt adjustment. Determining the tilting angle of the blades 32, 34 as described above, an adjustment can be reached by which the torque acting on the front rotating part 25' and the rear rotating part 25" is practically identical. The eventually remaining resultant torque, which cannot be reduced to zero by the adjustment of the blades 32, 34, can be eliminated by the appropriate adjustment of the generator unit 306—essentially by limiting the generated output power—or in certain embodiments by the proper adjustment of the auxiliary rotor units. However, in the majority of the cases this is not necessary in practice, because the approximate zero torque can be adjusted by means of the tilting angle of the blades 32, 34.

In order to facilitate the above mentioned operation in some embodiments the apparatus comprises a control unit adapted for adjusting the direction of the front blades 32 and the rear blades 34 and—in the embodiments comprising the auxiliary rotor unit—at least one auxiliary rotor unit, and for regulating the driving unit 304 and the generator unit 306. In the embodiments comprising the control unit, the apparatus may preferably comprise wind sensor(s) 310 measuring wind velocity and/or wind direction and providing input parameters to the control unit. In some embodiments of the power generating apparatus according to the invention, the control unit and the wind sensors 310 are arranged on the power generating apparatus, for example on the body. In other embodiments of the power generating apparatus, the wind sensors 310 are arranged on the body of the apparatus, and the control unit or certain sub-units thereof, for example the sub-units responsible for calculation are arranged in the docking unit 20. In this case the control unit communicates with the wind sensors 310, for example through the data cable embedded in the cable 18 or by means of wireless technology, and—if there is such a unit—with the control unit parts arranged on the apparatus.

In the embodiments comprising the control unit, the control unit for example may have the functions detailed below. The various functions of the control unit are described by means of the method of setting the power generating apparatus to production—i.e. generator—mode.

In the basic position, the power generating apparatus is located in the docking unit 20. It may be housed in the docking unit 20 when it is not necessary to generate electric power or the weather conditions do not allow power generation. On appropriate conditions, the power generating apparatus can be put in operation, for example by means of a remote control or by means of an automatic system, which monitors and analyses the weather conditions. In this case, the power generating apparatus leaves the docking unit 20 by means of the main rotor units and/or in certain embodiments by means of the auxiliary rotor units, driven by the driving unit 304. Following the start-up, the control unit begins to analyse the signals of the wind sensors 310. In order to facilitate the appropriate operation of the control unit, other sensors, for example force measurer, accelerometers, torque meters, and gyroscopes can also be arranged on the power generating apparatus. During lifting, the control unit has double function. On the one hand, according to the above description, it ensures that the torque acting on the apparatus is to a close approximation zero, and after analysing the signals of the sensors and measuring units, it controls the drive of the main rotor units and in some embodiments that of the auxiliary rotor units in a way that for lifting the possible minimal power is to be led in, so that the apparatus shall use the wind energy even for lifting. To this end, the driving at least some of the main rotor units and the auxiliary rotor units are preferably stopped, and the blades of the suitably configured main rotor units are controlled into the covering position described in details below.

By means of the wind sensors 310, the control unit preferably continuously monitors its environment, also in the course of lifting and hovering. Consequently, controlled by the control unit, the power generating apparatus reaches the desired altitude using the possible minimal drive of the main rotor units and in some embodiments that of the auxiliary rotor units. At the desired altitude, the flow of the wind is laminar, to a close approximation. Having reached the preset altitude or the proper altitude based on the analysis of the signals of wind sensors 310, the control unit takes the following steps so as to the power generating apparatus get its power generating state. At the desired altitude, preferably, none of the main rotor units of the apparatus is driven and they are in a covering position. In those embodiments in which the completely covering position of the main rotor unit due to the number and/or design of the blades cannot be reached, it is advisable to cover the opening housing the main rotor unit by rotating the blades into the so-called partially covering position as much as possible. At the desired altitude, based on the measurements of the sensors and measuring units, respectively, even the surface of the apparatus body provides sufficient lifting force for the apparatus to hover, consequently the lifting force ensured by the driven main rotor units and the excess surface provided by the covering position are no longer necessary. If the apparatus is hovered exclusively by the lifting force of the air, due to its form the body of the power generating apparatus will be stabilised in such a manner that the plane of the main rotor units, i.e. the planes of the rotating parts 25', 25" are including an angle with the vertical plane. In this position, the control unit moves the blades 32, 34 of the rotating parts 25', 25" into operating position, if they were in the covering position, and allows the rotating parts 25', 25" to turn freely upon wind force, i.e. it enables the rotating parts 25', 25" to start operation in the generator mode. For optimising the generator mode, there are various possibilities in each embodiment, which will be described with each embodiment. To sum up, it is to be noted that for example in the embodiment of FIG. 1 the turning of the rotating parts 25', 25" in relation to the body 10 and in some of the embodiments the appropriate operation of the auxiliary rotor units and other factors are contribute to the optimization. It is noted further, that the control unit adjusts the body formed as a surface and the rotating parts 25', 25" in a way that their interrelated arrangement regarding the lifting force and the volume of generated power becomes optimal.

The apparatus does not comprise in all embodiments a control unit and wind sensors 310, respectively, and therefore adjusting the tilting angle of the blades 32, 34 can be preset or automatically in accordance with a pre-determined protocol as well.

In FIGS. 5A and 5B the completely covering position of the front blades 32 and rear blades 34 of the rotating parts 25', 25" is shown. The completely covering position cannot be reached in all embodiments of the invention as mentioned above, and in some embodiments, a partially covering position can be adjusted because of the smaller number of blades. In the completely covering position, airflow 38 turns back from the blades 32, 34. In the completely covering position, the blades 32 of the front rotating part 25' and the blades 34 of the rear rotating part 25" are practically turned into planes perpendicular to the cylindrical periphery of the frame 13, i.e. the tilting angle of the blades 32 and 34 is adjusted so that the surface of the blades 32 and 34 is essentially in these planes. In order to ensure a completely covering position by turning of the blades 32, 34 shown in the figure, the front rotating part 25' and the rear rotating part 25" are configured in a way that they can be brought into covering position by the adjustment of the front blades 32 and the rear blades 34. The surface of the blades 32, 34 is not necessarily plain, and therefore the requirement imposed on the completely covering position is that the blades 32 and 34 can be rotated and arranged in respect to each other on the drums 33' and 33", so that they practically cover the area surrounded by the frame 13. In this position, the blades represent an obstacle to the air, and therefore by supplementing the surface of the body, they contribute to the hovering of the apparatus, i.e. to its gliding similarly to the usual flying kites. In embodiments where the completely covering position can be provided, the covering of this area, i.e. the covering of the opening 11, 65, 71, 93, 111, 116 which houses the main rotor unit 12, 95 can be realized in several ways, and accordingly at least one of the rotating parts 25', 25" has the blades 32, 34 accomplishing essentially the complete covering of the openings 11, 65, 71, 93, 111, 116 or the blades 32, 34 of the front rotating part 25' and the rear rotating part 25" are formed to cover the openings 11, 65, 71, 93, 111, 116 supplementing each other. Some of the openings 11, 65, 71, 93, 111, 116 appear in the embodiments described below. In the completely covering position, the blades 32 and 34 preferably do not rotate or their rotation is hindered by the drive (304)/generator (306) unit.

In embodiments, where the completely covering position cannot be provided because of the design, in the above cases the rotating parts are set to a partially covering position. In the partially covering position, the blades are turned by the blade adjustment unit in a position other than the operating position, where they constitute an obstacle to the air, but it is not beneficial to drive and use them as a generator. In the partially covering position, the blades—which are typically not flat, but have a distorted surface—are rotated into such a position where the largest possible part of their surface is parallel with the opening. In the operating position, the blades are in a different slightly turned position, for instance like an aircraft propeller.

In the power generating apparatus according to the invention, according to the above description, the main rotor unit comprises blades, which can be moved into a partially covering position performing the partial coverage of the opening or into a completely covering position in which the opening is essentially completely covered.

In case of using the auxiliary rotors only for lifting of the power generating apparatus, the blades of the main rotor unit are preferably set as much parallel as possible with the movement of the apparatus, so that they supplement the surface of the body as little as possible, thereby reducing the air resistance of the apparatus. In case of using the auxiliary rotor units for facilitating the lifting of the apparatus, it is advantageous when the air resistance of the apparatus is as low as possible.

Accordingly, each or some (in case there is more than one) of the main rotor units is (are) preferably in a completely or partially covering position when it is not necessary to use the lifting force generated by the driven main rotor for the lifting of the apparatus, because lifting is ensured by the lifting force acting on the increased surface created in the completely or partially covering position. The completely or partially covering position of the main rotor units can also be applied in the embodiments of the invention comprising an auxiliary rotor unit, when each or some of the auxiliary rotor unit(s) contribute(s) to or completely perform(s) the lifting of the power generating apparatus. In these embodiments, in appropriate conditions (wind direction, wind intensity, etc.), due to the increased surface a larger lifting force arises and the auxiliary rotor units contribute to a very small extent to the lifting or in an appropriate case the contribution of the auxiliary rotor units is not required.

FIG. 6A is a top view of the embodiment shown in FIG. 1. The figure shows that the auxiliary rotor units 16 are arranged close to the corners of the essentially triangular body 10, and the main rotor units 12 are in the central part of the body 10 in the openings 17 and 11. The main rotor units 12 and the auxiliary rotor units 16 are preferably arranged practically in a regular order, facilitating thereby the minimising of the torque acting on the apparatus, as their control becomes simpler due to the regular order.

FIG. 6B shows the dotted circle part of FIG. 6A. The figure illustrates that the auxiliary rotor unit 16 is housed in a frame 28 through a second shaft 24. The auxiliary rotor unit 16 comprises the blades 26. The frame 28 is adjoined to the body 10 through a first shaft 22. Such a link between the auxiliary rotor unit 16 and the body 10 allows the adjustment of the auxiliary rotor unit 16 in any direction. FIG. 6C shows how the auxiliary rotor unit 16 can be turned around the shaft 22 and the shaft 24.

FIG. 7 is a side view of the embodiment shown in FIG. 1. The figure illustrates that the main rotor units 12 can be turned in any direction relating to the body 10, and therefore the apparatus in this embodiment can be adjusted to the wind direction in such a manner that the body 10 and the main rotor unit 12 are positioned separately and appropriately regarding the wind direction. Appropriate adjustment means that the main rotor units 12 face the wind, and the body 10 is positioned to challenge the wind at an angle favourable for hovering. While hovering, the auxiliary rotor units 16 are preferably switched off, but if necessary, they can contribute to the generation of the lifting force necessary for hovering or to minimising the torque arising on the power generating apparatus.

Figure 8:
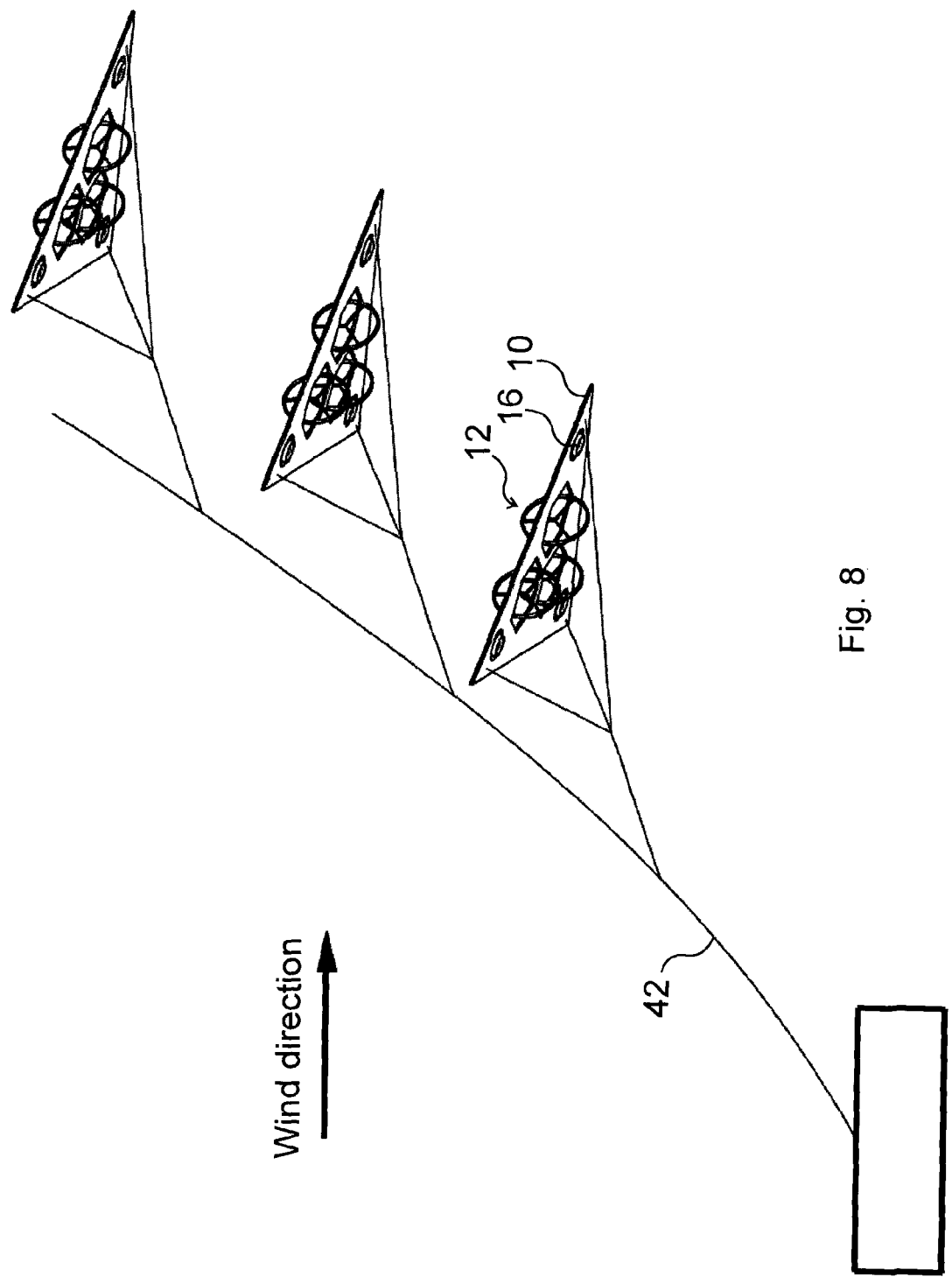
FIG. 8 shows a system made of a plurality of the embodiment of the power generating apparatus according to the invention, shown in FIG. 1, where the apparatuses are connected in a first mode.

FIG. 8 shows an arrangement of three power-generating apparatuses connected to each other by means of a cable 42. In this arrangement, the power generating apparatuses are practically connected in series. In this way, any number of the power generating apparatuses according to the invention can be connected by means of an appropriate cable. Joining the power generating apparatuses may also be conceived that they generate power entirely independently of each other, i.e. each power generating apparatus is responsible for lifting and hovering itself. A connection may also be conceived with which the controlling of the lifting and hovering of each power generating apparatus depends on one another.

Figure 9:
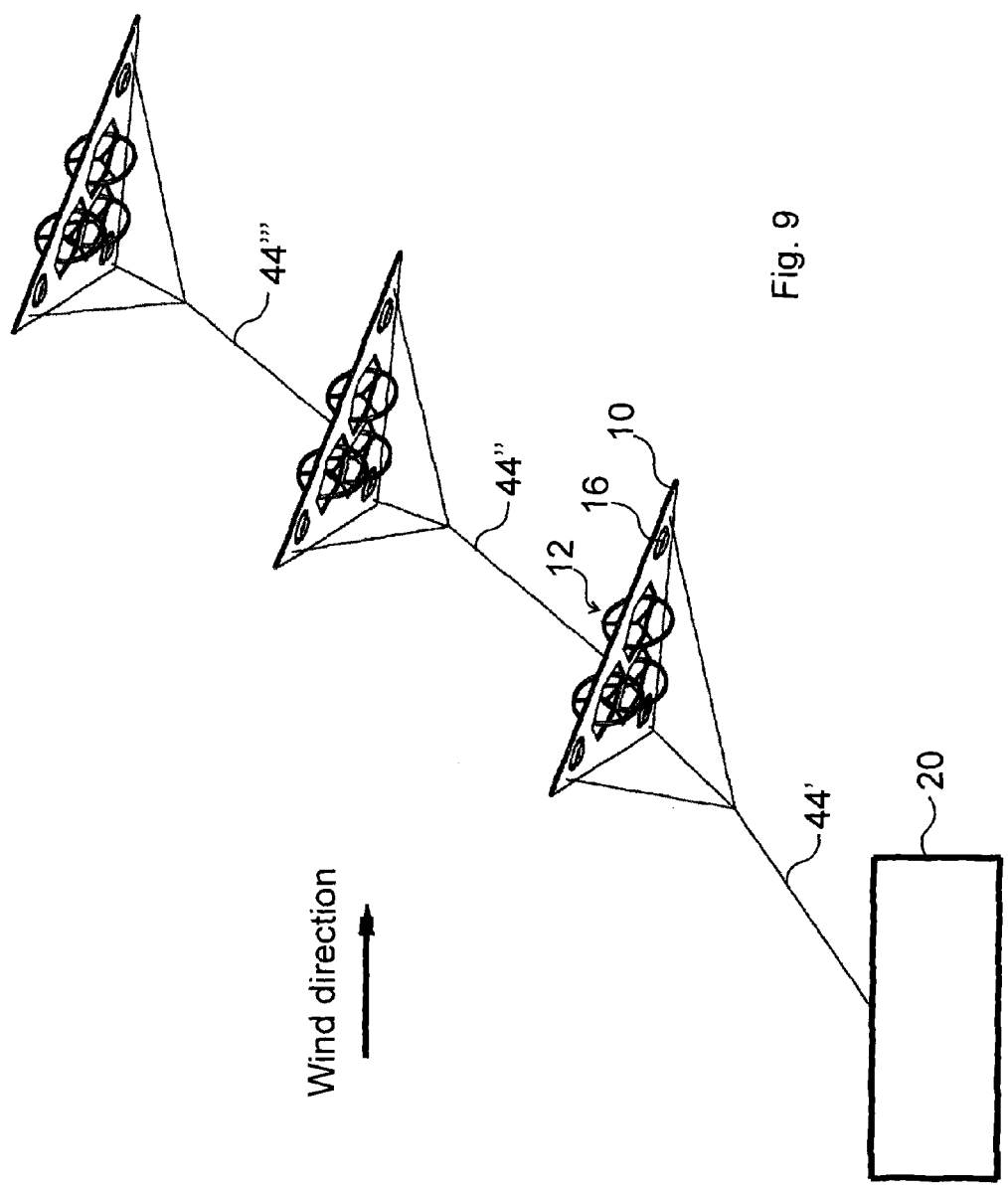
FIG. 9 shows a system made of a plurality of the embodiment of the power generating apparatus according to the invention, shown in FIG. 1, where the apparatuses are connected in a second mode.

FIG. 9 shows an arrangement of the power generating apparatus according to the invention, which is very similar to that of shown in FIG. 8. In this arrangement the various power generating apparatuses are connected by cables 44', 44", 44'''. The configuration of the cables 44', 44", 44''' applied in this arrangement differs significantly from the configuration of the cable 42. According to the configuration of the cable 42, the ancillary cable parts branch off from a main branch of the cable 42 and the power generating apparatuses are linked thereto. However, in this embodiment, each of the cables 44', 44, 44" directly link the power generating apparatuses.

Figure 10:
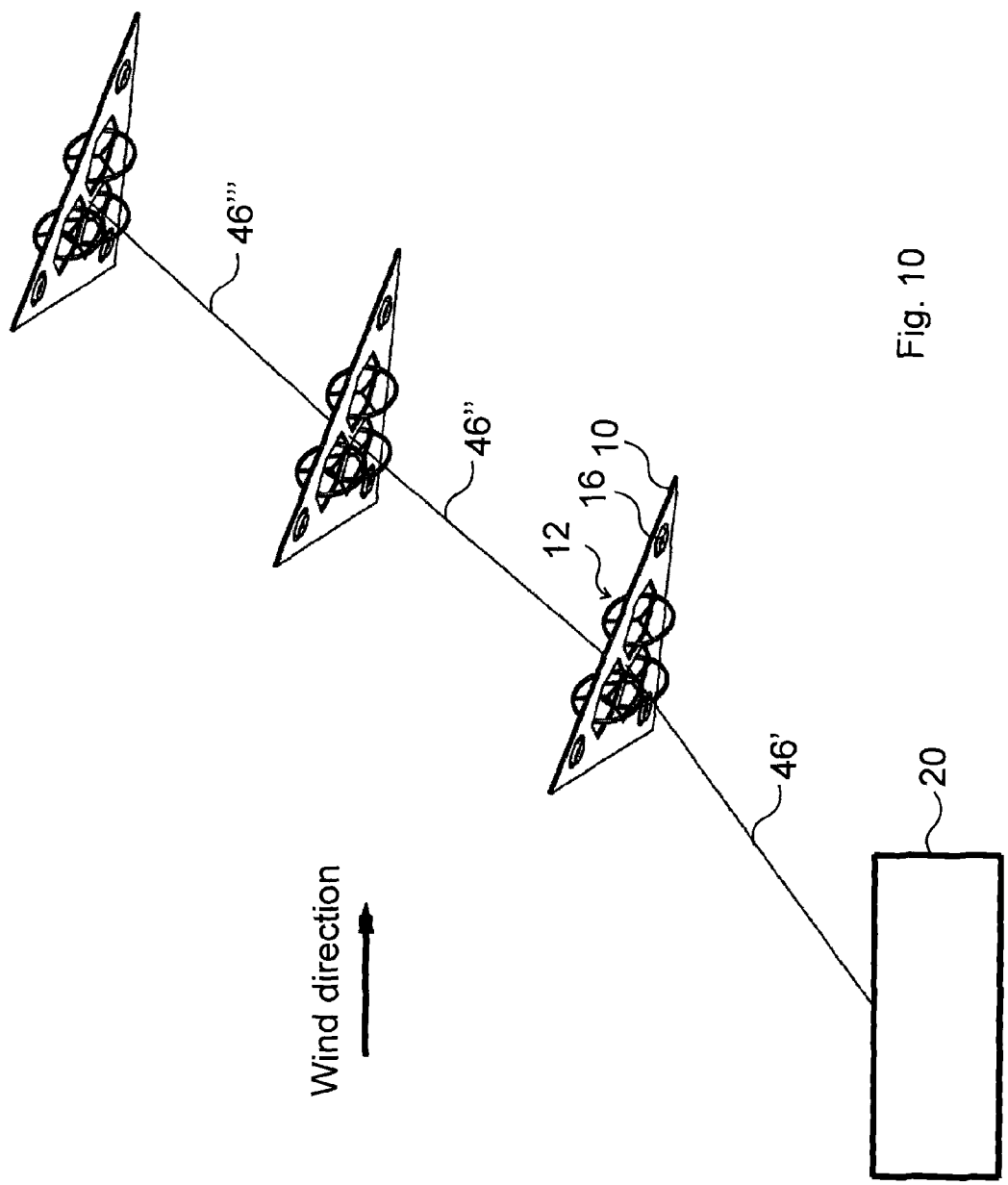
FIG. 10 shows a system made of a plurality of the embodiment of the power generating apparatus according to the invention, shown in FIG. 1, where the apparatuses are connected in a third mode.

The arrangement shown in FIG. 10 is principally identical with the arrangement of FIG. 9, but the various power generating apparatuses are connected by cables 46', 46", 46'''. The above considerations regarding the interdependence of power generating apparatuses are valid for the arrangements shown in FIGS. 9 and 10.

The arrangements shown in FIGS. 8 to 10 can be realized by means of any embodiment of the power generating apparatuses. In the arrangements, the various embodiments can be combined arbitrarily, and an arbitrary number of power generating apparatuses can be used as described above.

Figure 11:
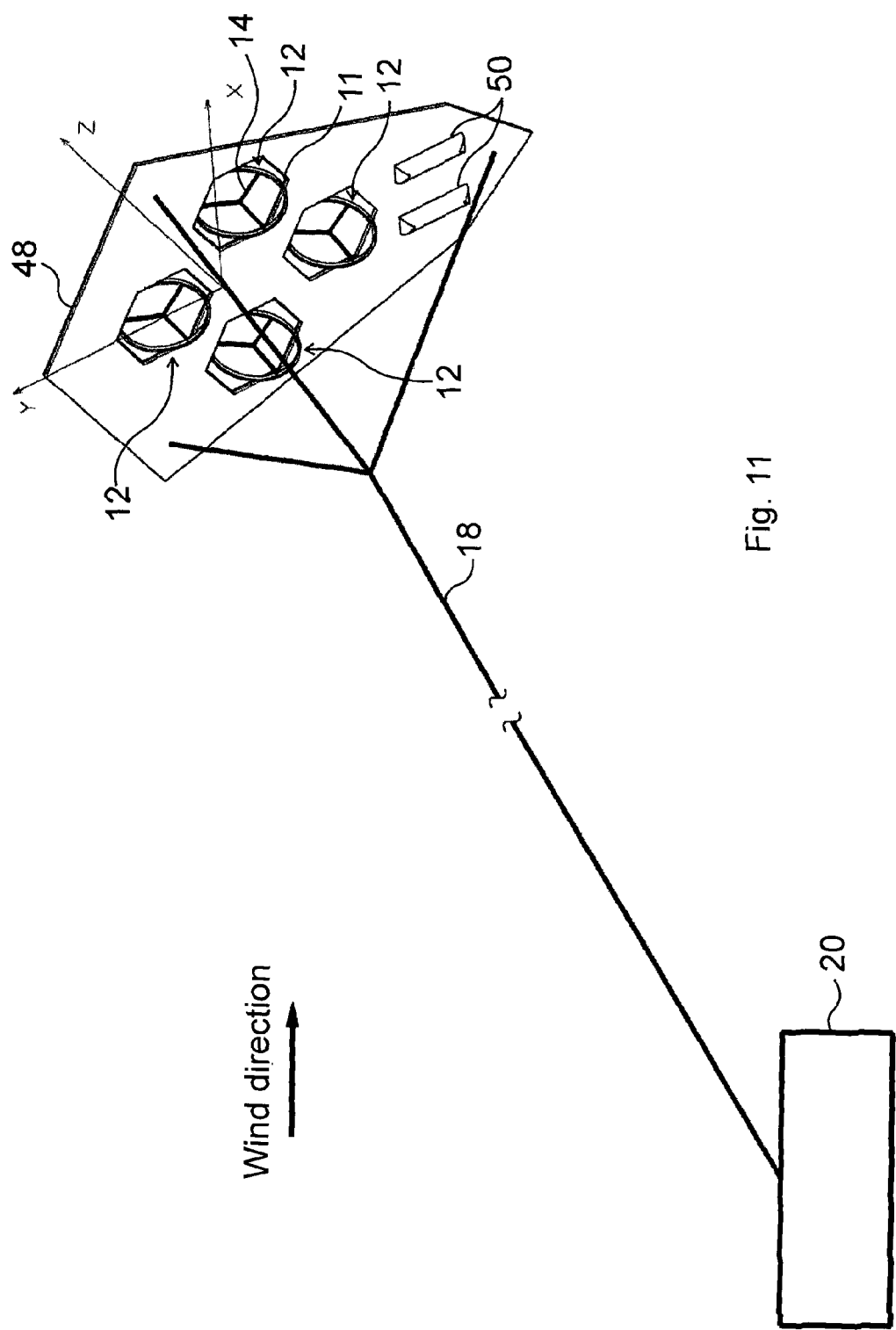
FIG. 11 is a perspective view of another embodiment of the power generating apparatus according to the invention.

FIG. 11 is a perspective view of a further embodiment of the power generating apparatus according to the invention. The figure shows that in this embodiment the apparatus comprises a body 48, which has a hexagonal shape with a single symmetry axis. In this embodiment, four main rotor units 12 are arranged in the appropriate openings 11 of the body 48. In this embodiment, the power generating apparatus does not comprise auxiliary rotor unit. Likewise, to the embodiment discussed above, the main rotor units 12 can be turned in relation to the body 48. In this embodiment, a unit 50 is arranged on the body 48 as well, and said unit 50 may comprise for example the above discussed control unit or a part thereof, the wind sensors 310, and the measuring instruments listed above. Furthermore, the unit 50 may also comprise a parachute, which opens in case of emergency to avoid the damage of the power generating apparatus when it falls. Parachutes can be arranged on the apparatus in any embodiment.

FIG. 12 shows an embodiment similar to that in FIG. 11. The current embodiment comprises furthermore an adjustable wing blade 58 supporting the stability of the apparatus and a tail member 60, which contributes to the stability of the apparatus and adjoins to the body 54. Similarly to other embodiments, the current embodiment of the apparatus has a symmetrical design, i.e. because of its shape, it essentially steadily hovers if the wind is exempt from eddies. The stability of the power generating apparatus may further be enhanced by using the tail member 60 and through opening the wing blades 58 to an appropriate extent, even adjusting the facility dynamically to the changes of the wind direction. This embodiment preferably comprises a control unit, which, in addition to other elements of the apparatus, controls the extent of opening the wing blades 58 in a way that it minimises the torque acting on the apparatus, and provides the largest possible surface for facilitating the hovering of the apparatus. In the present embodiment, a unit 56 is arranged on the body 54, which may comprise the sensors and measuring instruments listed above.

Figure 13A:
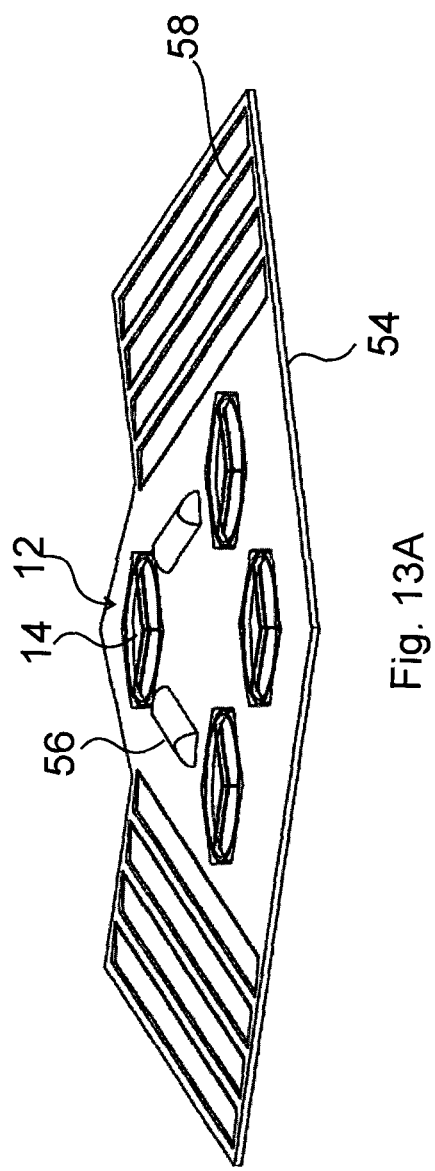
FIG. 13A is a perspective front view of the embodiment shown in FIG. 12, where the wing blades are in a closed position.
Figure 13B:
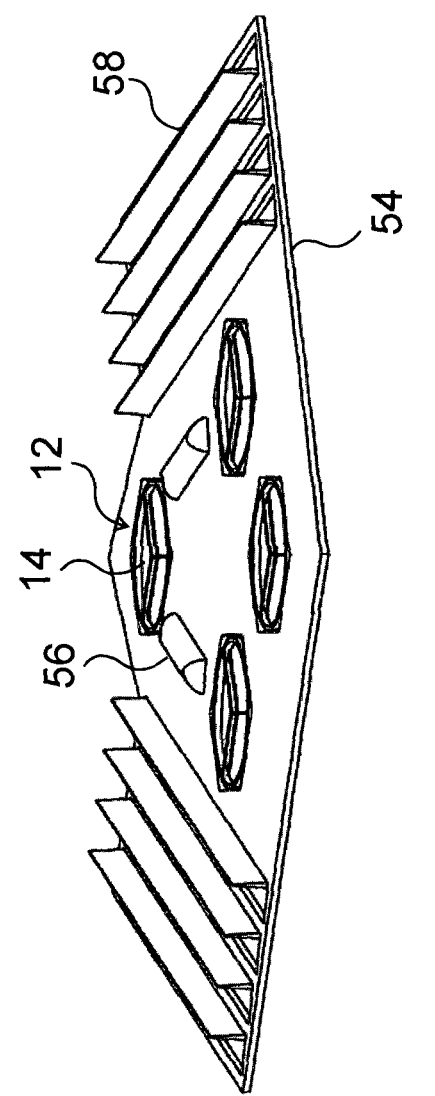
FIG. 13B is a perspective front view of the embodiment of FIG. 12 where the wing blades are in operating position.

FIGS. 13A and 13B are a front view of the embodiment depicted in FIG. 12, with closed and opened wing blades 58. The wing blades 58 have double function in their open position. On the one hand, they reduce the surface exposed to wind. The torque exerted on the apparatus can be regulated by opening and closing different number of wing blades 58 arranged at the two edges of the body 54. In addition, the opened wing blades 58 also play the role of flow profiles.

The wing blades may also be arranged in a different way on the body, for example a certain wing blade in its open position laterally protrudes from the body, and in its closed position it is retracted into the body. Wing blades may also be arranged in a different embodiment of the invention.

Figures 14A, 14B:
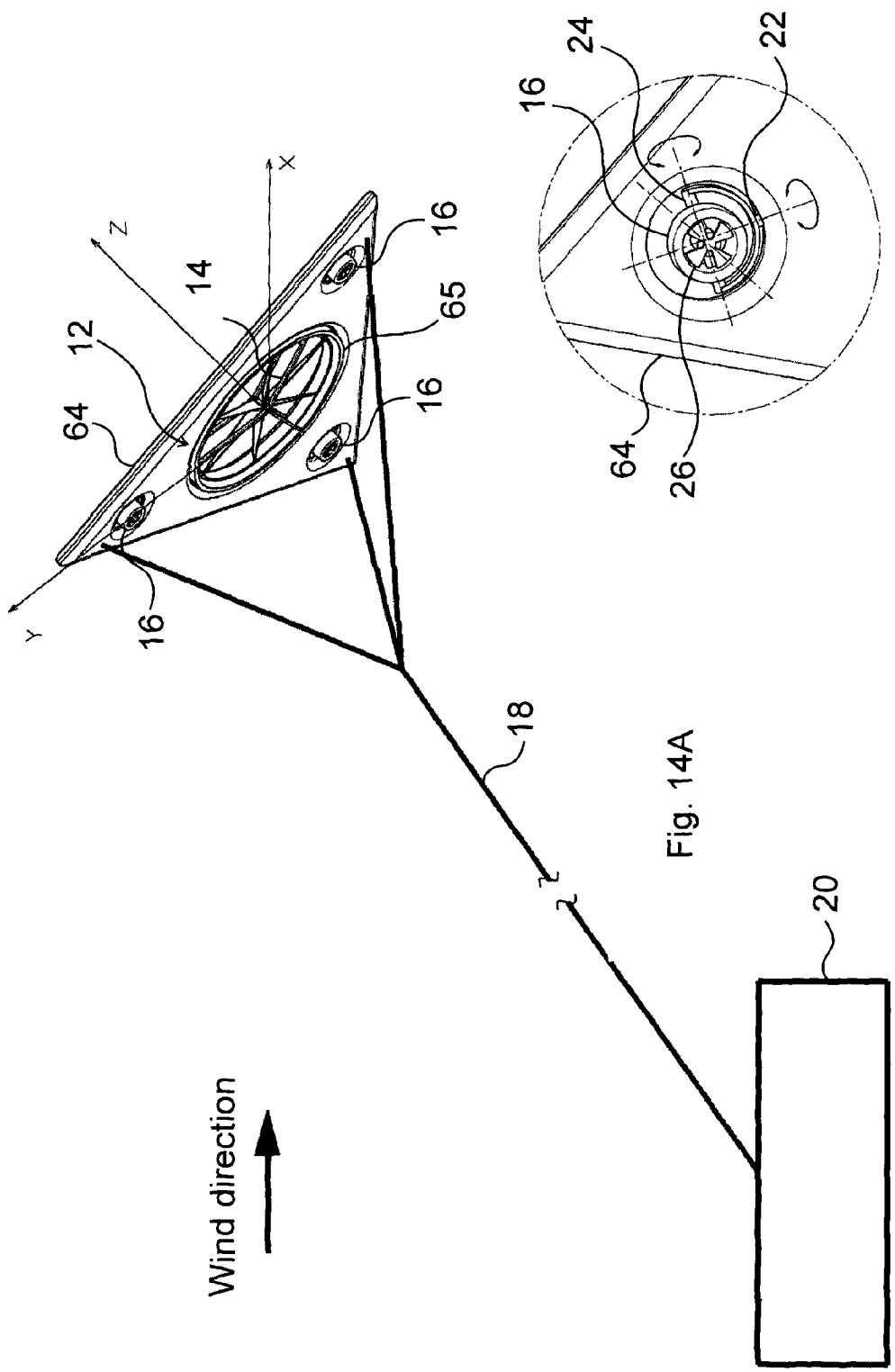
FIG. 14A is a perspective view of a further embodiment of the power generating apparatus according to the invention.
FIG. 14B is a perspective view of the auxiliary rotor unit in the embodiment of FIG. 14A.

FIG. 14A shows an embodiment, which is very similar to the embodiment of FIG. 1. Regarding the embodiment of FIG. 1, the most significant difference is that in the present embodiment there is a single main rotor unit 12 coupled to a body 64. In this embodiment, the main rotor unit 12 can be turned in respect to the body 64 and it is arranged in an opening 65. FIG. 14B depicts an auxiliary rotor unit 16, the structure of which is identical with that of the auxiliary rotor unit 16 shown in FIG. 6C, and it features only minor, non-functional design differences.

FIG. 15A shows a yet further embodiment of the invention. In this embodiment, the apparatus comprises a body 70, which has a cylindrical mantle surface. This cylindrical mantle surface surrounds the main rotor unit 12 arranged in an opening 71. At protrusions 74, wing blades 68 and auxiliary rotor units 72 are coupled to the body 70, according to the figure. A tail member 78 also adjoins to the body 70 through a protrusion 79. In this embodiment, therefore, the surface of the body 70 is a cylindrical surface, which—because of the air flowing through it—can provide an appropriate lifting force despite of its non-planar surface. The body 70 may also have a more longish shape compared to the depicted in the figure, in order to provide appropriate lifting force. FIG. 15B is a perspective view of the auxiliary rotor unit 72 used in the embodiment of FIG. 15A. The auxiliary rotor unit 72 adjoins the protrusion 74 through a first shaft 84. A frame 76 is coupled to the shaft 84, which frame 76 supports a second shaft 86. The auxiliary rotor unit 72 is realized with a row of blades 82. The operating principle of the auxiliary rotor unit 72 is the same as that of the auxiliary rotor unit 16 discussed above.

In FIGS. 16A-C and 17A-C the front view, side view and perspective view of the open and closed positions of the adjustable wing blade 68 are shown, respectively. In its closed position the wing blade 68 supplements the surface of the body 70 as shown in FIG. 17A-C, because in this position parallel to the cylindrical shaped body 70 additional surfaces are created. The extent of torque acting on the apparatus can be influenced by wing blades 68 some of them in closed, while others in open position.

Figure 18:
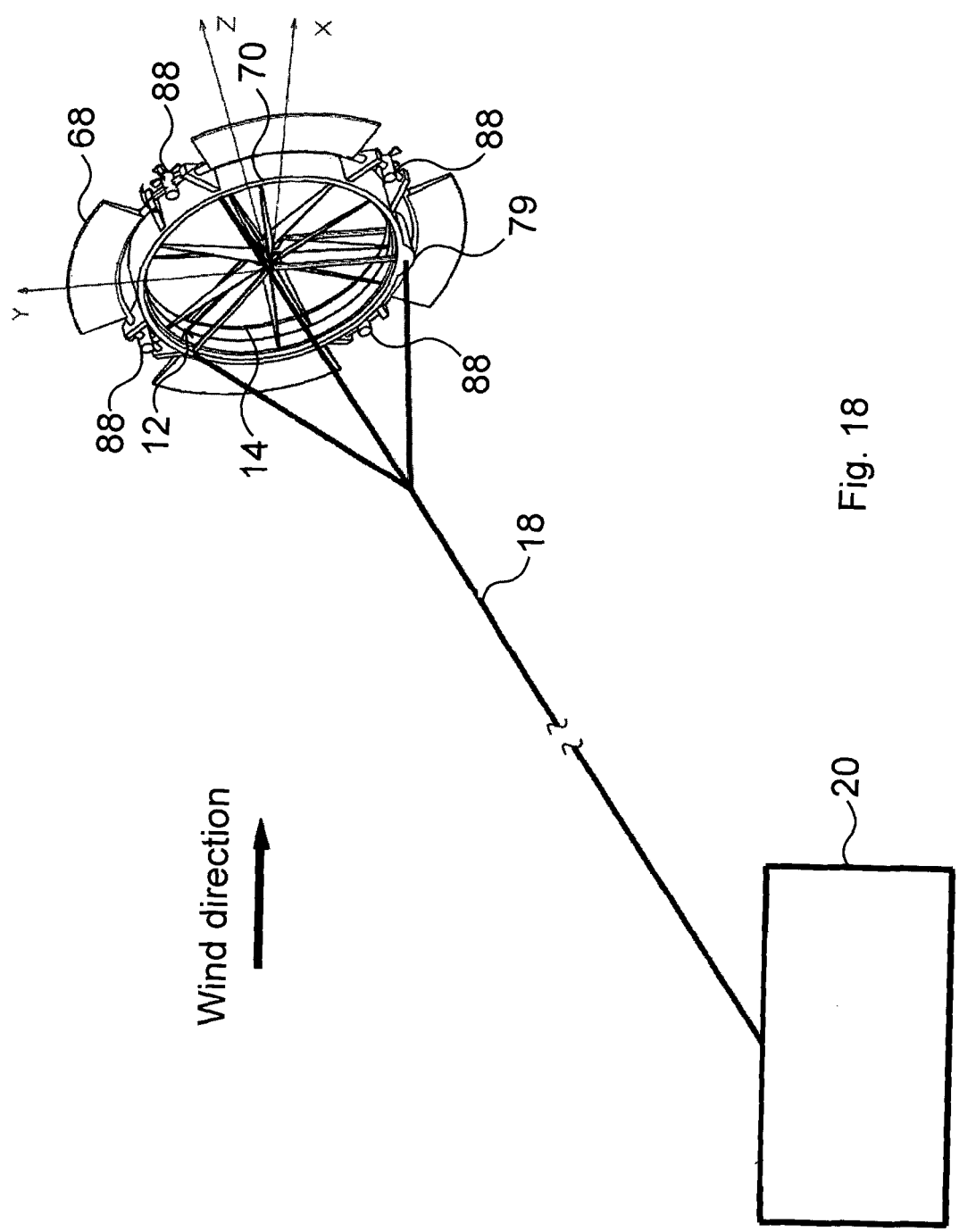
FIG. 18 is a perspective view of an embodiment of the power generating apparatus according to the invention.

FIG. 18 shows a still further embodiment of the power generating apparatus according to the invention. In this embodiment, the apparatus comprises four auxiliary rotor units 88 and four wing blades 68, respectively. FIGS. 19A-19C and FIGS. 20A-20C, respectively, showing the open and closed positions of the wing blades 68, similarly to FIGS. 16A to 16C and 17A to 17C.

In the embodiments shown in FIGS. 15A and 18, the body 70 surrounds the main rotor unit 12. The main rotor unit 12 can be coupled to the body 70 in two ways. On the one hand, it may be adjoined via the shaft 30 shown in FIG. 2. In this case, the main rotor unit 12 can be turned in relation to the body 70, enabling the appropriate orientation of both the body 70 and the main rotor unit 12 regarding the wind direction. On the other hand, it may be coupled such that the body 70 and the frame 13 of the main rotor unit 12 are integrated. In the latter case, no shaft 30 is coupled to the main rotor unit 12, and the body 70 and the main rotor unit 12 cannot be turned in relation to each other.

Figure 21:
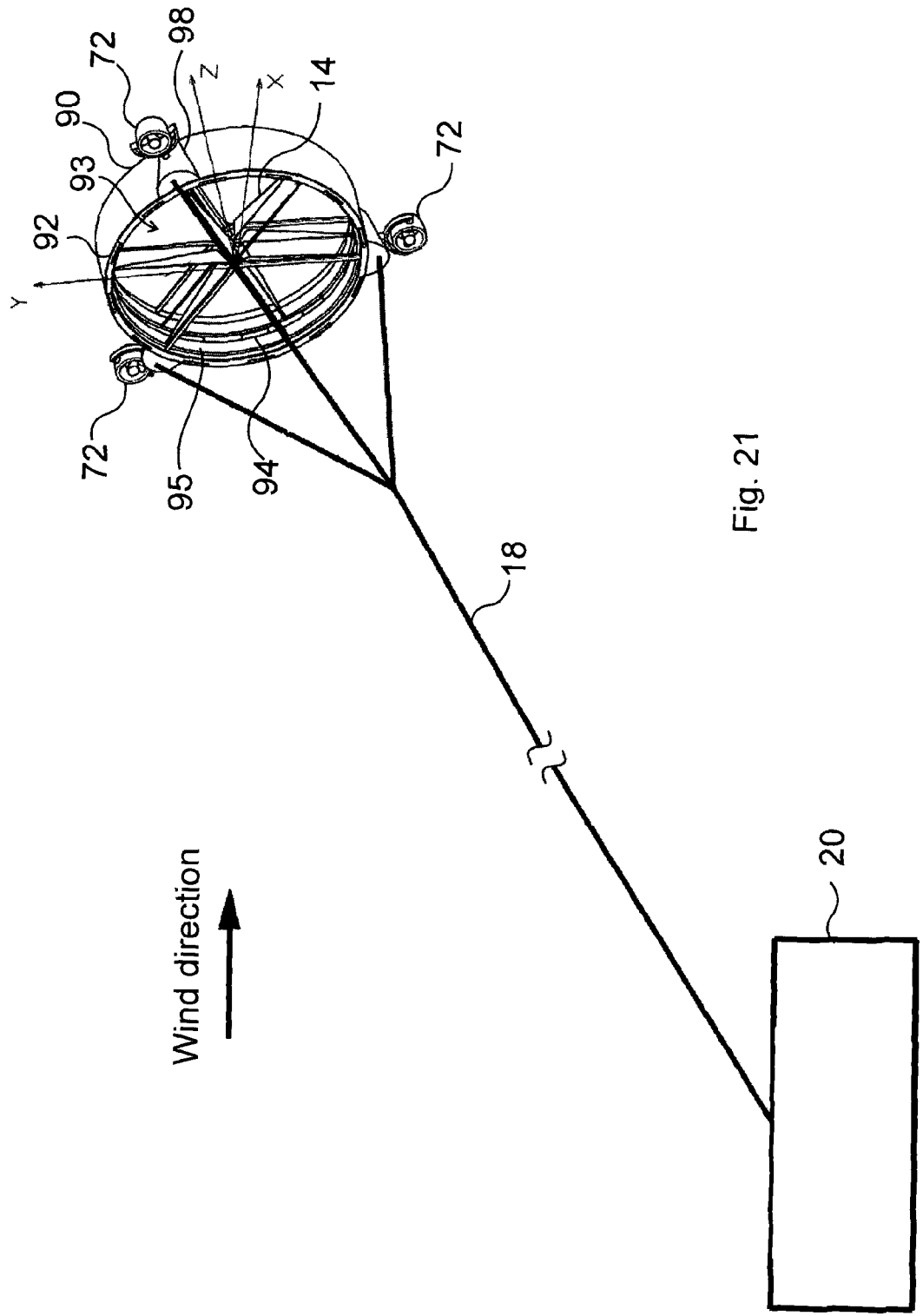
FIG. 21 is a perspective view of a further embodiment of the power generating apparatus according to the invention.

FIG. 21 shows a further embodiment of the power generating apparatus. In this embodiment, the apparatus comprises a body 90, and the auxiliary rotor units 72 are coupled to the body 90 through protrusions 98. In the present embodiment, bores 104 are located in the body 90 connecting a front opening 92 and a rear opening 94, and the air entered at the front opening 92 is directed through the bores 104 and the rear opening 94 to the rear rotating part 25". In this embodiment, the apparatus comprises a main rotor unit 95 arranged in an opening 93, and the said rotor unit differs from the main rotor unit 12 shown in FIG. 2 in that its frame is integrated with the body 90 and in that the bores 104 are located in the body 90.

FIG. 22A is a front view of the crucial parts of the power generating apparatus embodiment shown in FIG. 21. FIG. 22B is a perspective view of the auxiliary rotor unit 72.

FIG. 23A is a sectional view of the main rotor unit 95. The rotating parts 25', 25" fitted with the blades 32, 34 are arranged on a shaft 102 in the main rotor unit 95. The figure also shows the arrangement of the openings 94. FIGS. 23B and 23C show the design of the bores 104, with or without the use of end piece 106. It can be seen that without the use of the end piece 106, the air flows along a wind direction 105, and as a result of the openings 94 which guide the air through the bore 104 to the rear rotating part 25", the amount of air hitting the rotating part 25" increases in comparison with the state shown in FIG. 23C, where the volume of air reaching the rotating part 25" is only regulated by the tilting angle of the blade 32, and the air flows along a wind direction 107. As a result, according to the present embodiment, the blades 32 of the front rotating parts 25' may be adjusted with a smaller tilt—exposing a larger surface to the wind—in comparison with the position in FIG. 23C in a way that thanks to the air flowing through the bore 104, the volume of air reaching the rotating part 25" does not decrease compared to the state in FIG. 23C. Therefore, in this embodiment, from the aspect of the generated output power, thanks to the bores 104, the tilting angle of the blades 32, 34 can be adjusted more favourably, and hence because of the design, the generated output power may increase when compared with the embodiments without the bore 104.

Figure 24:
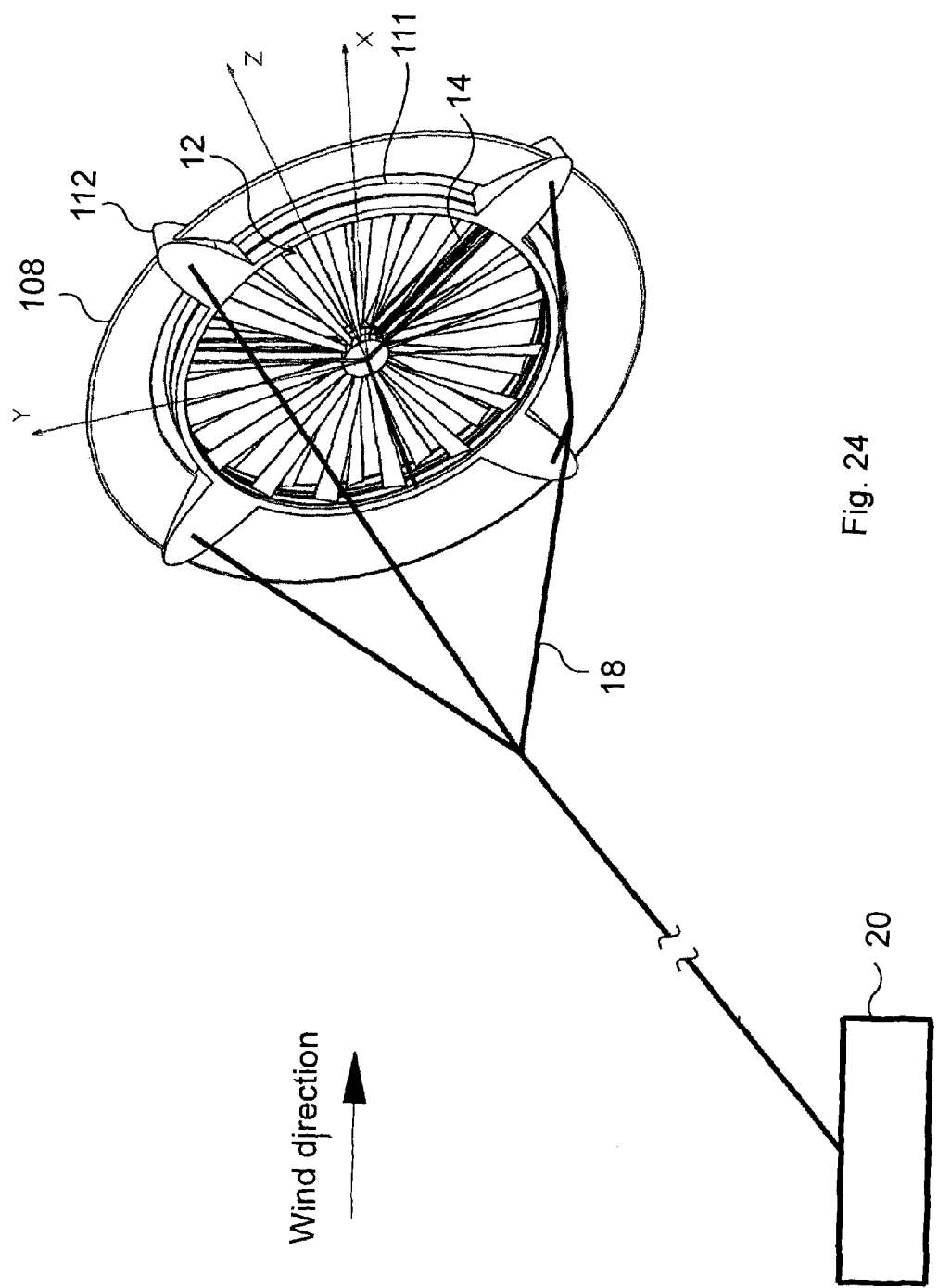
FIG. 24 is a perspective view of an embodiment of the power generating apparatus according to the invention.

FIG. 24 shows a yet further embodiment of the power generating apparatus according to the invention. In this embodiment, the apparatus comprises a body 108, to which the main rotor unit 12 arranged in an opening 111 is coupled through protrusions 112. Consequently, in this embodiment, the body 108 has a flat surface surrounding the main rotor unit 12, which supplements the surface of the body 108 in the covering position of its blades 32, 34. In this embodiment, therefore, it is especially advisable to apply such a main rotor unit 12, the blades of which can be adjusted so that they cover the opening in which the main rotor unit 12 is arranged.

Figure 25:
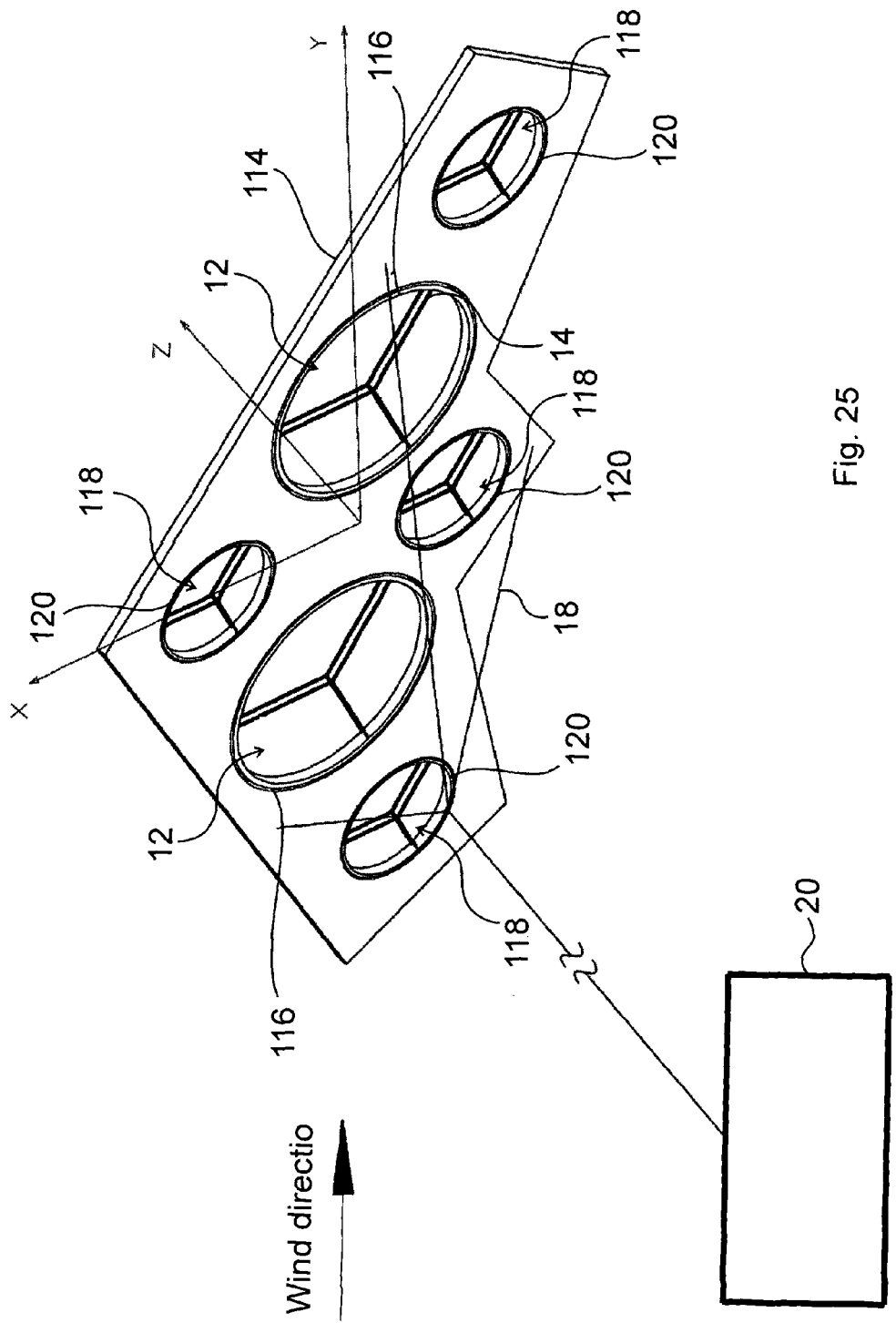
FIG. 25 is a perspective view of a further embodiment of the power generating apparatus according to the invention.

FIG. 25 shows a further embodiment of the power generating apparatus according to the invention. In this embodiment, the apparatus comprises a body 114 having a flat surface. In the body 114 openings 116 are formed. The main rotor units 12 are arranged in the openings 116. Furthermore, auxiliary rotor units 118 arranged in the openings 120 of and are coupled to the body 114. For example, the coupling of the auxiliary rotor units 118 may be realized as shown in FIG. 6C, and similarly to the coupling of the main rotor unit 12. In the figure, the auxiliary rotor units 118 are presented schematically, similarly to the main rotor units 12; even in the present embodiment the auxiliary rotor unit 118 also comprises an auxiliary rotating part fitted with blades and an auxiliary driving unit 308 for driving the auxiliary rotating part. In this embodiment, the configuration of the auxiliary rotor unit 118 is preferably similar to the configuration of the main rotor unit 12, and therefore in the present embodiment, at least one, but preferably all of the auxiliary rotor units 118 comprise furthermore an auxiliary generator unit designed for generating electric power upon rotation of the auxiliary rotating part, further, the auxiliary driving unit 308 and the auxiliary generator unit are integrated into the auxiliary rotor unit 118. Similarly to the design of the main rotor unit 12 as shown in FIG. 2, at least one and preferably all of the auxiliary rotor units 118 comprise an auxiliary rotating element fixed to the ends of the blades, and a frame fitted with an auxiliary stator element matched to the auxiliary rotating element, and the frame surrounds the auxiliary rotating part. In those embodiments of the invention in which the auxiliary rotor unit is configured in this manner, further to the main rotor unit the auxiliary rotor unit(s) is (are) able to operate in generator mode, thus in case of strong wind, the generated power increases.

In the present embodiment, the auxiliary rotor unit 118 is arranged in an opening 120 of and is coupled to the body 114. Similarly to the main rotor unit, it is advantageous to arrange the auxiliary rotor unit also in an opening of the body, because in this way they can contribute to the hovering, kiting of the body even if neither the blades of the main rotor unit, nor the blades of the auxiliary rotor unit can be adjusted to completely cover the opening. Because of this, the main rotor unit and/or the auxiliary rotor unit—opposite of the prior art solutions where the rotors and the body facilitating hovering are separated in space—are advantageously integrated in the body. The arrangement of the rotor units in the openings of the body entails the advantage in addition to those mentioned above that the complete power generating apparatus may have a more compact design in comparison with such prior art power generating apparatuses, which also have a body to facilitate hovering.

In accordance with the above description, the auxiliary rotor units may also be configured in a way that their blades get the operating position or the covering position as required, similarly to the appropriate version of the main rotor unit.

In the present embodiment, the power generating apparatus preferably has a control unit adapted for regulating the revolutions of the auxiliary rotor unit 118. Accordingly, in this embodiment, the movement or hovering characteristics of the power generating apparatus can preferably be influenced by regulating the revolutions of the auxiliary rotor units 118.

In the present embodiment, the shape of the body 114 is similar to the shape of a stealth aircraft. The body 114 can preferably be made of aluminium or properly strengthened plastic.

The bodies formed as flat surfaces are preferably not built around a frame, but they are made in one piece, machining the upper and lower surfaces separately. The surfaces can be shaped for example by pressing. By means of pressing, the body may be formed to an appropriately aerodynamic shape; for example, it can be fitted with the convex/concave wing ends used with aircrafts. The body may also be made of two pieces, preferably forming a bottom and a top surface, which can be adjoined by an appropriate adhesive or by screw joint.

Figure 26B:
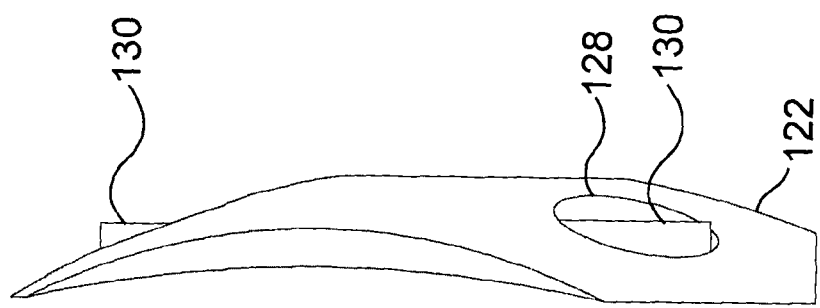
FIG. 26B is a side view of the embodiment of the invention shown in FIG. 26A.
Figure 26A:
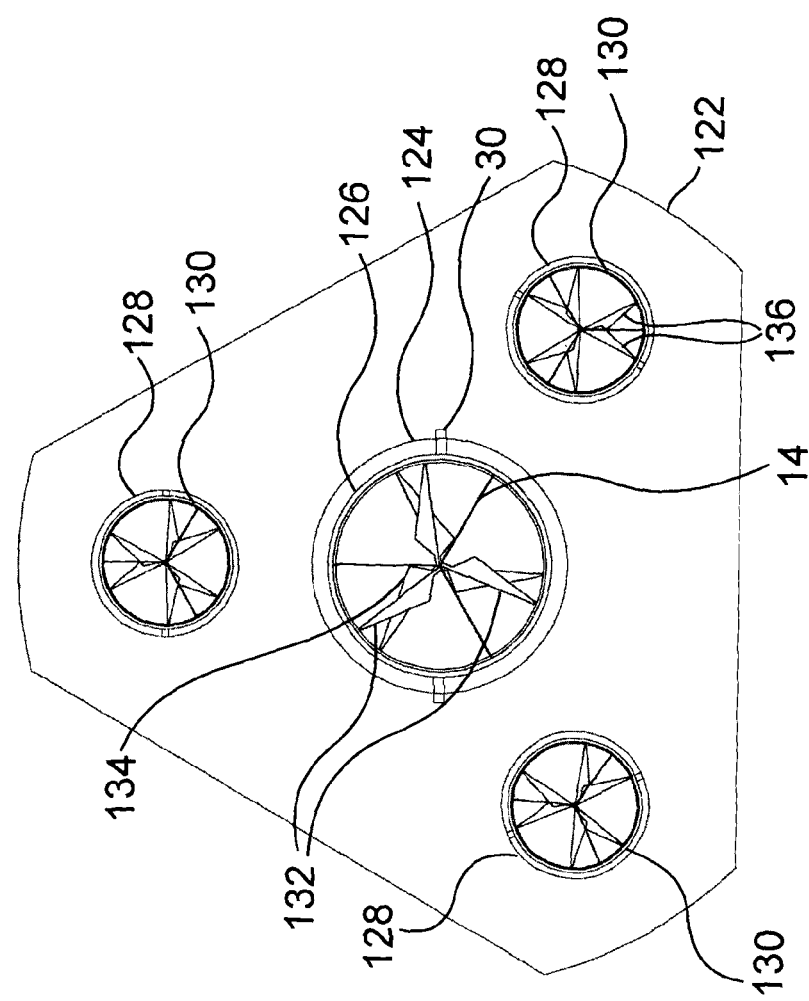
FIG. 26A is a top view of a yet further embodiment of the power generating apparatus according to the invention.

FIG. 26 shows a further embodiment. In the present embodiment, the power generating apparatus comprises a body 122. A main rotor unit 126 is arranged in an opening 124 of the body 122, and auxiliary rotor units 130 are located in openings 128. In this embodiment, front blades 132 and rear blades 134 of the main rotor unit—due to their form and number—can be brought into the partially covering position mentioned above, contrary to the main rotor unit 12 shown in FIG. 3, where the blades 32 and 34 can be adjusted in a completely covering position. According to the figure, the main rotor unit 126 and the auxiliary rotor units 130 are coupled through a shaft to the body, thus they can be rotated around this shaft. The design of the blades 136 of the auxiliary rotor units 130 is similar to the blades 132 of the main rotor unit 126.

In some embodiment, further airflow controlling baffle elements may be adjoined to the body. These baffle elements may facilitate a better airflow around the body provided with openings, to facilitate hovering. It is to be noted further that the edges of the body and the sides of the wing blades might be configured with a profile, with which the air leaving the surface will also contribute to the hovering of the apparatus.

Along the cable, facilities measuring its tensioning can be arranged to avoid a cable load approaching or exceeding the tensile strength of the cable. These measuring instruments may also supply input signals to the control unit, and thereby they are able for example to repel emergency by changing the adjustment of the main or auxiliary rotor units or the wing blades, or to initiate the landing of the apparatus. In case of emergency detected in a different way, for example in case of emergency detected by wind sensors 310, the control unit may initiate the landing of the apparatus, which performed in the same way as the lifting.

The scope of the invention extends to the operating of the power generating apparatus as well. In the course of the process, by generating a lifting force, the lifting of the power generating apparatus is started, and after the lifting the front blades 32 and the rear blades 34 are adjusted to rotate in opposite directions, and the main rotor unit 12, 95 is operated in generator mode.

In certain embodiments, especially in those where the power generating apparatus does not comprise an auxiliary rotor unit, the lifting force is generated by driving the main rotor unit 12, 95.

In embodiments, in which the power generating apparatus comprises at least one and preferably multiple auxiliary rotor unit 16, 72, 88, 118 comprising an auxiliary rotating part fitted with blades 36, 136 and an auxiliary driving unit 308 adapted for driving the auxiliary rotating part, the method is carried out in a way that the lifting force is generated by driving at least one auxiliary rotor unit 16, 72, 88, 118 out of at least one auxiliary rotor unit 16, 72, 88, 118. In this case, during the lifting process, the blades 32, 34 of the main rotor unit 12, 95 are turned preferably in approximately parallel position with the lifting direction.

If the method is performed by a power generating apparatus comprising an auxiliary rotor unit, the at least one auxiliary rotor unit 118 preferably comprises furthermore an auxiliary generator unit for generating electric power from the rotation of the auxiliary rotating part, and the auxiliary driving unit 308 and the auxiliary generator unit are integrated into the auxiliary rotor unit 118. With such embodiments, the method is preferably performed in a way that after the lifting, at least one auxiliary rotor unit 118 of the at least one auxiliary rotor unit 118 is operated in generator mode.

The invention is, of course, not limited to the preferred embodiments described in details above, but further variants, modifications and developments are possible within the scope of protection determined by the claims.

The invention claimed is:

1. A power generating apparatus exploiting wind energy, comprising
   a body,
   a main rotor unit comprising a front rotating part being fitted with front blades being adjustable at an angle, and a rear rotating part being fitted with rear blades being adjustable at an angle, said front rotating part and said rear rotating part having rotation axes aligned parallel to each other,
   a blade adjustment unit being adapted for adjusting the front blades and the rear blades to rotate in opposite directions,
   a cable enabling kiting of the body,
   a generator unit adapted for generating electric power from rotation of the front rotating part and the rear rotating part, and
   a wire adapted for conducting electric power generated by the generator unit,
   wherein the main rotor unit is arranged in an opening of and coupled to the body, and the main rotor unit can turn at least one of said rear blades and said front blades into a covering position covering at least part of the opening.

2. The power generating apparatus according to claim 1, further comprising a driving unit adapted for driving at least one of the front rotating part and the rear rotating part, and the driving unit and the generator unit are integrated into the main rotor unit.

3. The power generating apparatus according to claim 2, wherein the main rotor unit further comprises:
   at least one of a front rotating element fixed to the ends of the front blades and a rear rotating element fixed to the ends of the rear blades,
   a frame part formed with at least one of a front stator element matched to the front rotating element and a rear stator element matched to the rear rotating element, wherein the frame part surrounds the front rotating part and the rear rotating part.

4. The power generating apparatus according to claim 1, further comprising at least one auxiliary rotor unit being fixed to the body and facilitating lifting and stability of hovering of the apparatus, said at least one auxiliary rotor unit comprises an auxiliary rotating part fitted with blades and an auxiliary driving unit for driving the auxiliary rotating part.

5. The power generating apparatus according to claim 4, wherein the at least one auxiliary rotor unit further comprises an auxiliary generator unit adapted for generating electric power upon rotation of the auxiliary rotating part, and the auxiliary driving unit and the auxiliary generator unit are integrated into the at least one auxiliary rotor unit.

6. The power generating apparatus according to claim 5, wherein the at least one auxiliary rotor unit further comprises an auxiliary rotating element fixed to the ends of the blades, and a frame formed with an auxiliary stator element matched to the auxiliary rotating element, wherein the frame surrounds the auxiliary rotating part.

7. The power generating apparatus according to claim 4, further comprising a control unit for adjusting the direction of at least one of the front blades, the rear blades and the at least one auxiliary rotor unit, and to control the driving unit and the generator unit.

8. The power generating apparatus according to claim 7, further comprising a wind sensor for measuring at least one of the wind velocity and wind direction and providing input parameters to the control unit.

9. The power generating apparatus according to claim 7, wherein the control unit regulates the revolutions of the at least one auxiliary rotor unit.

10. The power generating apparatus according to claim 4, wherein the auxiliary rotor unit is coupled to the body as being turnable around a first shaft and a second shaft arranged perpendicular to each other, and in a way that the auxiliary rotor unit can be adjusted in any direction.

11. The power generating apparatus according to claim 4, wherein the auxiliary rotor unit is arranged in an opening of and coupled to the body.

12. The power generating apparatus according to claim 1, further comprising a frame surrounding the front rotating part and the rear rotating part, being adjoined to the body through a shaft, and the frame is allowed to turn around the shaft.

13. The power generating apparatus according to claim 1, further comprising an adjustable wing blade facilitating the stability of the apparatus.

14. The power generating apparatus according to claim 1, further comprising a tail element being coupled to the body, and facilitating the stability of the apparatus.

15. The power generating apparatus according to claim 1, further comprising deflector elements arranged on the body regulating the air flow.

16. The power generating apparatus according to claim 1, wherein the cable and the wire form one unit.

17. The power generating apparatus according to claim 1, wherein the main rotor unit can bring at least one of said rear blades and said front blades into a covering position essentially completely covering the opening.

18. The power generating apparatus according to claim 1, wherein the blade adjustment unit enables independent tilt adjustment of the front blades and the rear blades, respectively.

19. The power generating apparatus according to claim 18, wherein at least one of the front and rear rotating parts has blades essentially completely covering the opening either separately or supplementing each other.

20. The power generating apparatus according to claim 1, wherein the body has an essentially flat surface.

21. The power generating apparatus according to claim 1, wherein the body has a cylindrical mantle surface.

22. The power generating apparatus according to claim 21, further comprising at least one bore formed in the body, connecting a front opening and a rear opening, where the air entering the bore at the front opening is directed to the rear rotating part by means of the rear opening.

23. A method for operating the power generating apparatus according to claim 1, comprising the steps of:
    starting lifting of the power generating apparatus by generating lifting force, and
    after the lifting, adjusting the front blades and the rear blades to rotate in opposite directions
    wherein the main rotor unit is operated in generator mode.

24. The method according to claim 23, wherein the lifting force is generated by driving the main rotor unit.

25. The method according to claim 23, wherein the apparatus further comprises:
    at least one auxiliary rotor unit comprising:
        an auxiliary rotating part fitted with blades and
        an auxiliary driving unit adapted for driving the auxiliary rotating part, and
    wherein the lifting force is generated by driving the at least one auxiliary rotor unit.

26. The method according to claim 25, wherein during the lifting step the blades of the main rotor unit are adjusted in a direction approximately parallel with that of the lifting.

27. The method according to claim 25, wherein the at least one auxiliary rotor unit further comprises an auxiliary generator unit adapted for generating electric power upon rotation of the auxiliary rotating part, the auxiliary driving unit and the auxiliary generator unit are integrated into the auxiliary rotor unit, and
    after the lifting step, the method further comprises operating the at least one auxiliary rotor unit in generator mode.

28. The power generating apparatus according to claim 1, wherein said front rotating part and said rear rotating part have coincident rotation axes.

29. The method according to claim 26, wherein the at least one auxiliary rotor unit further comprises
    an auxiliary generator unit adapted for generating electric power upon rotation of the auxiliary rotating part, the auxiliary driving unit and the auxiliary generator unit are integrated into the auxiliary rotor unit, and
    after the lifting step, the method further comprises operating the at least one auxiliary rotor unit in generator mode.

* * * * *